United States Patent [19]

Miller et al.

[11] Patent Number: 4,860,285

[45] Date of Patent: Aug. 22, 1989

[54] MASTER/SLAVE SYNCHRONIZER

[75] Inventors: Merle L. Miller; Dale E. Gulick, both of Austin, Tex.

[73] Assignee: Advanced Micro Devices, Inc., Sunnyvale, Calif.

[21] Appl. No.: 111,475

[22] Filed: Oct. 21, 1987

[51] Int. Cl.[4] .................................................. H04J 3/06
[52] U.S. Cl. ...................................... 370/100; 375/118
[58] Field of Search ................... 370/100, 103; 371/47; 375/106, 111, 118

[56] References Cited

U.S. PATENT DOCUMENTS

| | | | |
|---|---|---|---|
| 3,940,558 | 2/1976 | Gabbard et al. | 370/103 |
| 4,330,854 | 5/1982 | Zeitraeg | 370/100 |
| 4,355,387 | 10/1982 | Portejoie et al. | 370/102 |
| 4,429,386 | 1/1984 | Graden | 370/100 |
| 4,499,575 | 2/1985 | Dupuis et al. | 370/100 |
| 4,525,849 | 6/1985 | Wolf | 375/118 |

Primary Examiner—Douglas W. Olms
Assistant Examiner—Melvin Marcelo
Attorney, Agent, or Firm—H. Donald Nelson; Davis Chin

[57] ABSTRACT

A synchronizer (100, 102, 104, 106) is disclosed operable in a variety of modes. In a Master/Slave mode the synchronizer receives synchronizing clock signals from a device to which it is a "slave" and generates therefrom synchronizing clock signals to a device to which it is a "master". In a Slave/Slave mode the synchronizer receives synchronizing clock signals from two devices to which it is a slave. In this mode the synchronizer can buffer misalignment between the clocks and report their phase difference for corrective action. In a Slave mode, the synchronizer only receives a synchronizing clock signal. A data-routing multiplexer (50, 108, 110) is employed in conjunction with the synchronizer which allows five devices to be connected to the synchronizer. Signals may be routed between any of the devices. Buffers (112, 120, 122) internal to the data-routing multiplexer perform the frame alignment function.

11 Claims, 11 Drawing Sheets

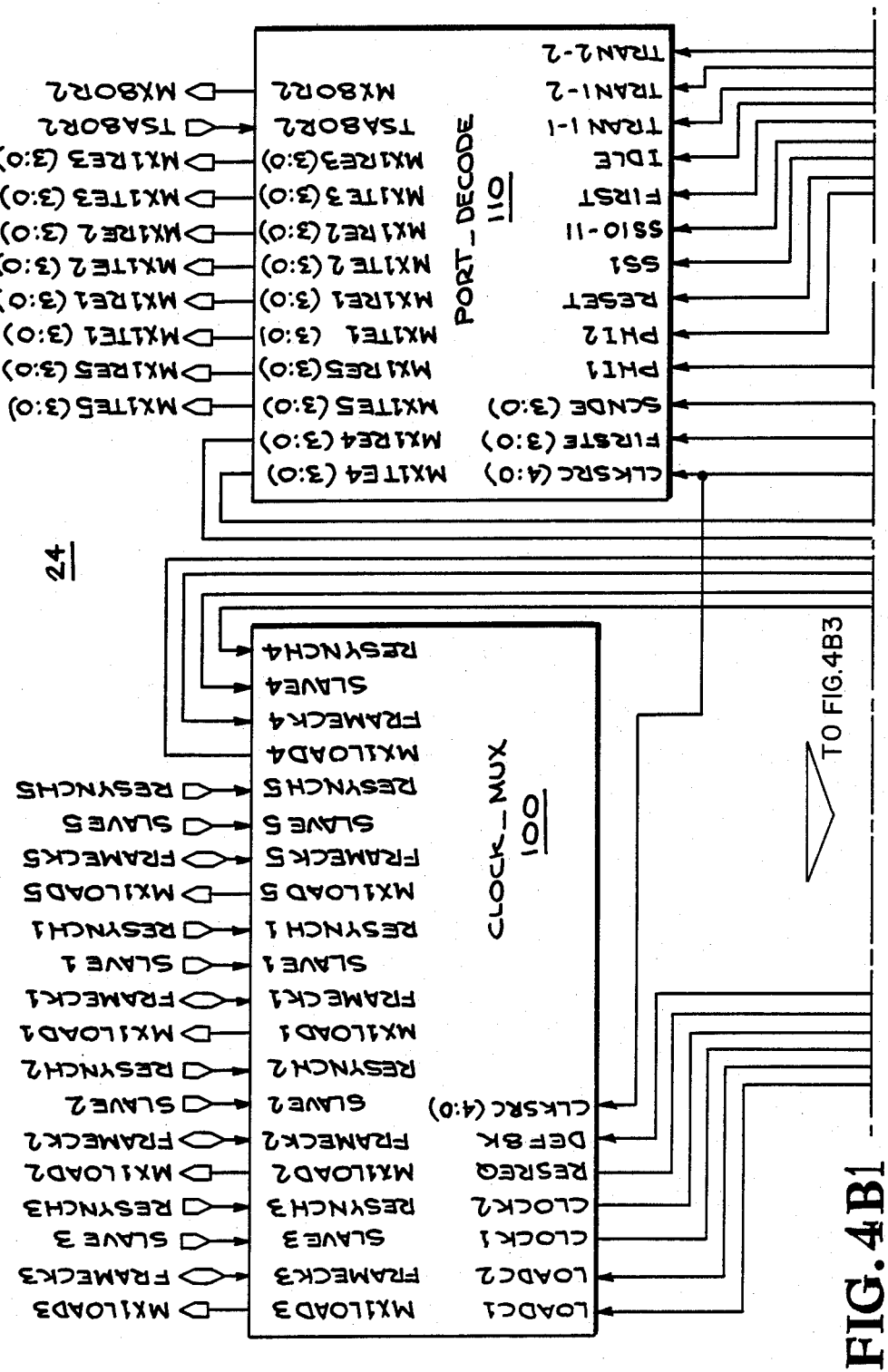
FIG. 4B1

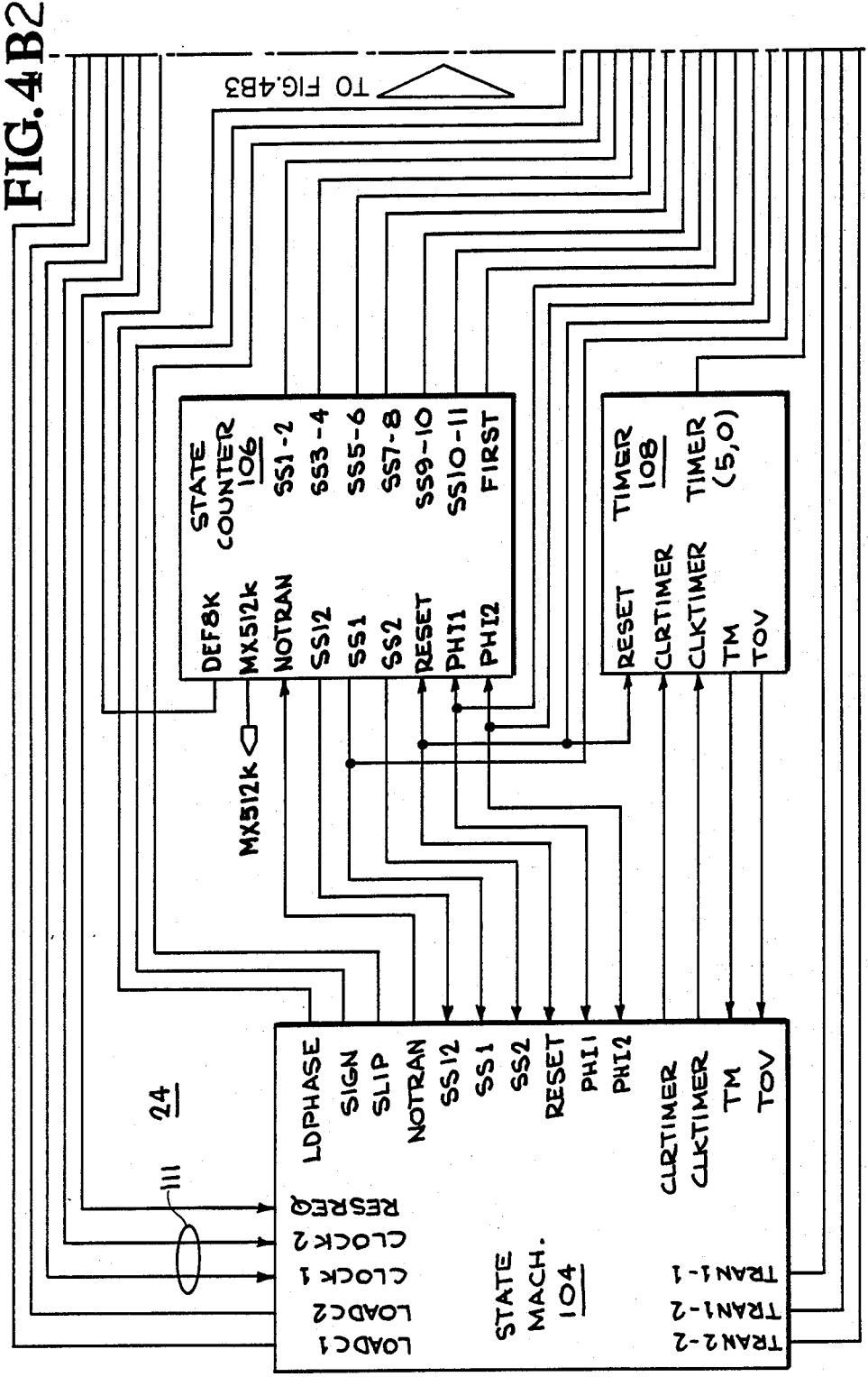

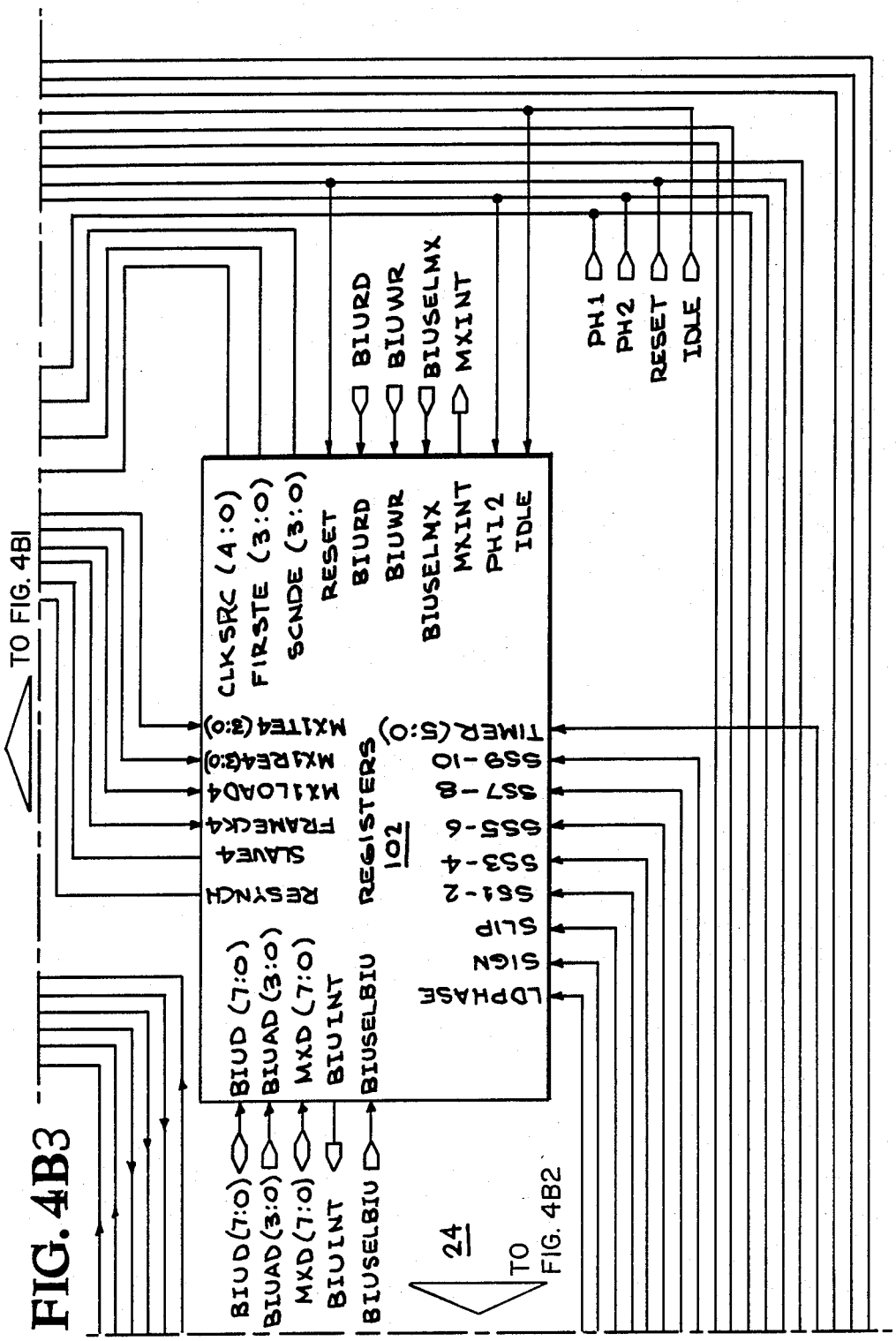
FIG. 4B3

A 1-1 TRANSFER TAKES PLACE AFTER EACH CF1 EVENT.
A 2-2 TRANSFER TAKES PLACE AFTER EACH CF2 EVENT.

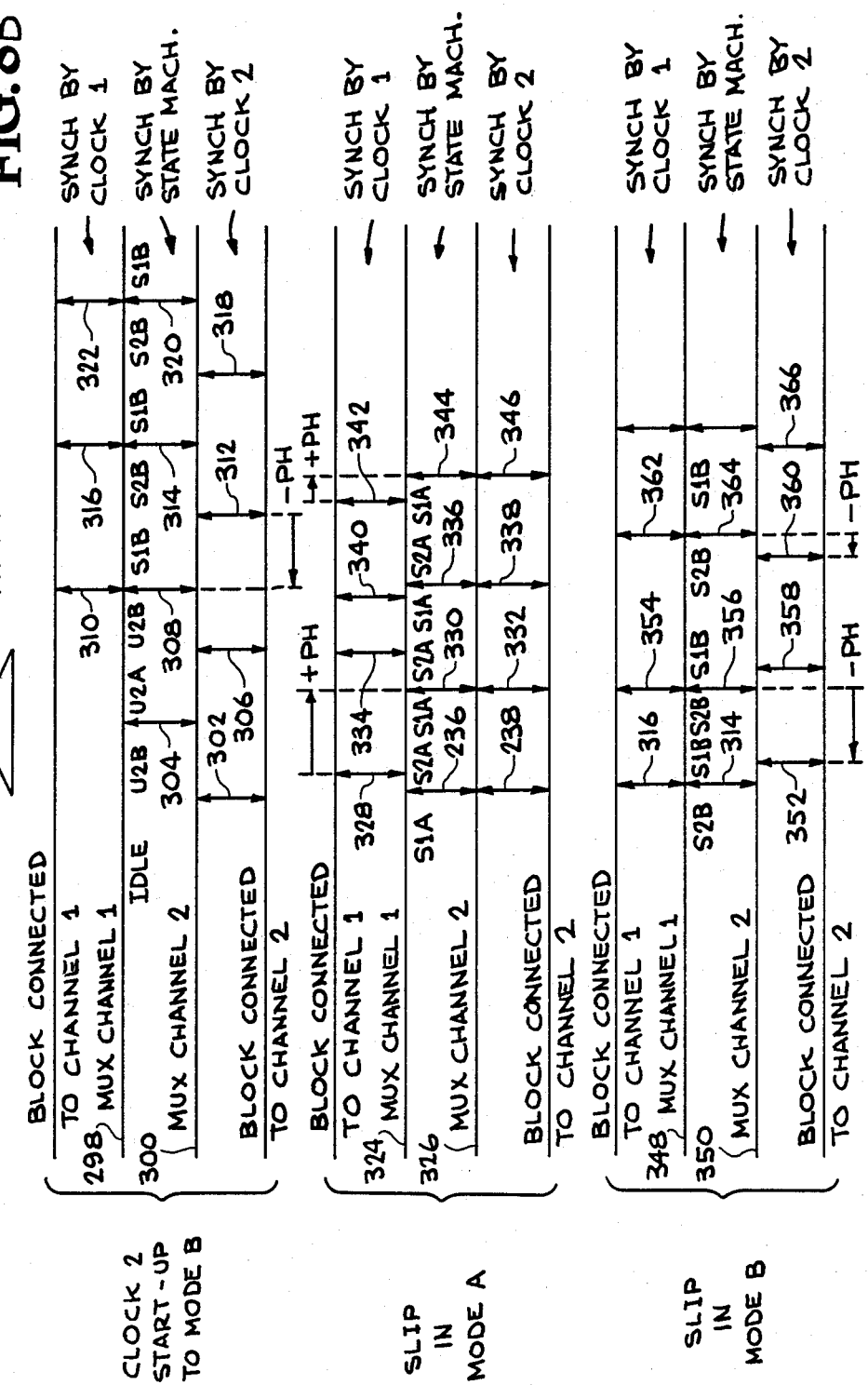

MASTER/SLAVE SYNCHRONIZER

CROSS-REFERENCE TO RELATED, CO-PENDING APPLICATIONS

Related, co-pending applications of particular interest to the instant application are U.S. Pat. No. 4,635,255, issued Jan. 6, 1987, entitled "Digital Subscriber Controller"; U.S. Pat. No. 4,736,362, issued Apr. 5, 1988, entitled "Programmable Data-Routing Multiplexer"; U.S. Ser. No. 891,438, filed July 26, 1986 entitled "Time Slot Assigner Multiplexer"; U.S. Ser. No. 034,822, filed Apr. 3, 1987, entitled "Data Protocol Controller"; U.S. Pat. No. 4,785,406 issued on Nov. 15, 1988 entitled "Quad Exchange Power Controller"; and U.S. Ser. No. 908,536, filed Sept. 17, 1986, entitled "Low Voltage and Low Power Detection Circuits"; all commonly-assigned with the instant application. These related, co-pending applications are incorporated by reference herein.

FIELD OF THE INVENTION

This invention relates to voice/data telecommunications and, more particularly, to an interface which can operate on either the subscriber or network side of an Integrated Services Digital Network (ISDN).

BACKGROUND OF THE INVENTION

Integrated Services Digital Network (ISDN) standards specify a subscriber "S" reference point (ISDN User-Network Interfaces-Layer 1 Recommendations contained in "CCITT I-Series Recommendations" which is incorporated herein by reference). Network Termination (NT) equipment can exist on either the subscriber or network side of the "S" interface and provides functions necessary for the operation of the access protocols by the network and essential functions for transmission. Terminal Equipment (TE) exists on the subscriber side of the "S" interface and provides functions necessary for the operation of the access protocols by the user. The CCITT reference points are conceptual showing the conjunction of two non-overlapping functional groups and may not correspond to a physical interface.

Depending on the placement of equipment with respect to the "S" interface, the equipment can be either a master or a slave in the sense that it is either a source of a clock synchronizing data movement over the interface or a receiver of a synchronizing clock, respectively.

In some instances, equipment resides between two clock sources, for example, it can receive a clock recovered from the network via the "S" interface and a clock recovered from a pulse code modulated (PCM) highway. Data may have to be moved between the "S" interface and the PCM highway, and the two data clocks will have the same or very nearly the same frequency. If they have different frequencies, data movement between the "S" interface and the PCM highway will result in occasional loss of data or doubling of data. When data is lost or doubled, because of different clock rates, data "slip" has occurred.

Typically, avoidance of data slip is performed by having a central circuit, separate from the equipment, which monitors the clocks from a number of equipment connected to the PCM highway and synchronizes the frequency of the highway. If the equipment is performing time-division multiplexing (TDM) of data from various sources and destinations, the synchronizing functions is separated from the multiplexing function, so that it is difficult to control data transfers through the multiplexer for anything but very small phase differences between the clocks. In addition, where the equipment is implemented by integrated circuitry, an extra pin is required to bring out the clock signal. Typically, pins are at a premium because of the complex functions performed by the integrated circuits, and their resultant need for numerous signals to be applied and conducted away from the circuit. Use of a pin for such an inessential signal is undesirable.

SUMMARY OF THE INVENTION

The master/slave synchronizer of the instant invention finds application in a Master/Slave Digital Exchange Controller (M/S DEC) which can be placed in any one of three different places with respect to the "S" interface. When the M/S DEC is used on the network side of the "S" interface, such as in a Switch, for example in a central office, Centrex, or Private Automatic Branch Exchange (PABX), it is connected to the "S" interface which is therefore "downstream" from it. In this case, the M/S DEC is a master to that "S" interface, i.e., the M/S DEC is a source of a synchronizing clock for the data transmitted on the ISDN. A pulse code modulated (PCM) Highway exists within the NT equipment at this interface; the M/S DEC thus resides on this PCM Highway, in this case. Since the M/S DEC is always a slave to the PCM Highway in terms of clock synchronization, the M/S DEC is said to be operating in a Master/Slave mode.

In a second location, when the M/S DEC is on the subscriber side of the "S" interface, but still within the NT equipment and still resides on the PCM Highway, then it is operating in a Slave/Slave mode, being both a slave to the "S" interface, and a slave to the PCM highway. In a third location, when the M/S DEC is on the subscriber side of the "S" interface but within TE, it will not reside on a PCM Highway, and will be operating in a Slave mode; being a slave to the "S" interface.

When the M/S DSC is operating in the Slave/Slave mode, the synchronizing clock of the PCM Highway and the synchronizing clock of the "S" interface can be asynchronous. Data streams synchronized by these two clocks can only be connected if their clock frequencies are the same or if occasional loss of data, or doubling of data, can be tolerated. Data lost or doubled because of asynchronous clocks is said to result from clock "slip". The master/slave synchronizer of the instant invention provides buffering of data between digital data streams synchronized by these asynchronous clocks, measurement of the phase between the clocks, and detection of clock slip which can cause corruption of data. A microprocessor, used in conjunction with the master/slave synchronizer, can digitally control the clock frequency of the PCM Highway.

The master/slave synchronizer, in a preferred embodiment, is part of a data-routing multiplexer and the synchronizer of the present invention provides a master clock which synchronizes data movement among sources and destinations, in addition to its clock alignment function described in the preceding paragraph. By combining this synchronizing function with the multiplexing function, the instant invention accommodates large phase differences between the asynchronous clocks without loss of data by taking corrective action.

This corrective action can be replacement by the microprocessor of a clock source by a more reliable one, such as another digital telephone line, or adjustment of one of the clocks, such as that of the PCM Highway.

The measured phase is read out by the microprocessor as a digital number. In a preferred embodiment, each phase unit is roughly 1/64 of a data clock period (called a frame). The clock alignment unit always initializes itself so that the phase starts out between −32 and +32. If the two data clocks differ by 100 ppM, for example, it will take at least 31/64 of a frame of drift to cause a slip, which will correspond to $(31/64) \times 10{,}000 = 4843.75$ frames. At a clock rate of 8 KHz, this is more than 600 ms. Once the clock rates have been adjusted to within 10 ppM, 6 seconds are required for a slip; hence, the microprocessor does not have to do adjustments very frequently. Normally, the microprocessor would activate a few lines at power-up time and adjust the PCM clock frequency until the average phase for the lines remained constant. It would then "adjust" the clock frequency often enough to compensate for drift in a frequency-controlling crystal.

Most of the circuitry of the instant invention is preferably contained in integrated circuits. The only external circuitry needed in the central control is a digital-to-analog converter (DAC) and a voltage-controlled crystal oscillator (VCXO) to allow the microprocessor to control the PCM highway frequency.

The advantages of Digital Frequency Control are:

(1) The frequency is controlled rather than the phase, so there are no sudden phase jumps;

(2) Most of the circuitry is in the ICs, so that very little external control circuitry is needed;

(3) Switching from one telephone line to another as a clock source causes no phase jumps, because the frequency is chosen to keep the phase constant but not to move it to zero;

(4) The digital phase information provides the controller with valuable diagnostic information on the reliability of the oscillator and the accuracy of the telephone lines;

(5) A noise glitch on one clock source will not cause a phase jump on the clock which is being controlled;

(6) Because the multiplexing and synchronization are handled in the same place data slips are easily detected; and (7) In a system such as a telephone switch with a central clock source (the PCM highway) and many incoming clock sources (slave digital telephone lines), each of the incoming clock sources can have its own data movement synchronization unit.

BRIEF DESCRIPTION OF THE DRAWINGS

FIGS. 4A to 4B3, combined, are a unitary drawing of the synchronizing MUX 24 comprising FIG. 4A showing the data-routing multiplexer portion and FIGS. 4B1 to 4B3 showing the data movement synchronizer of the instant invention.

FIGS. 8A and 8B illustrates six data transfer operations performed by the data movement synchronizer portion of MUX 24.

DETAILED DESCRIPTION OF A PREFERRED EMBODIMENT

Figure 1:
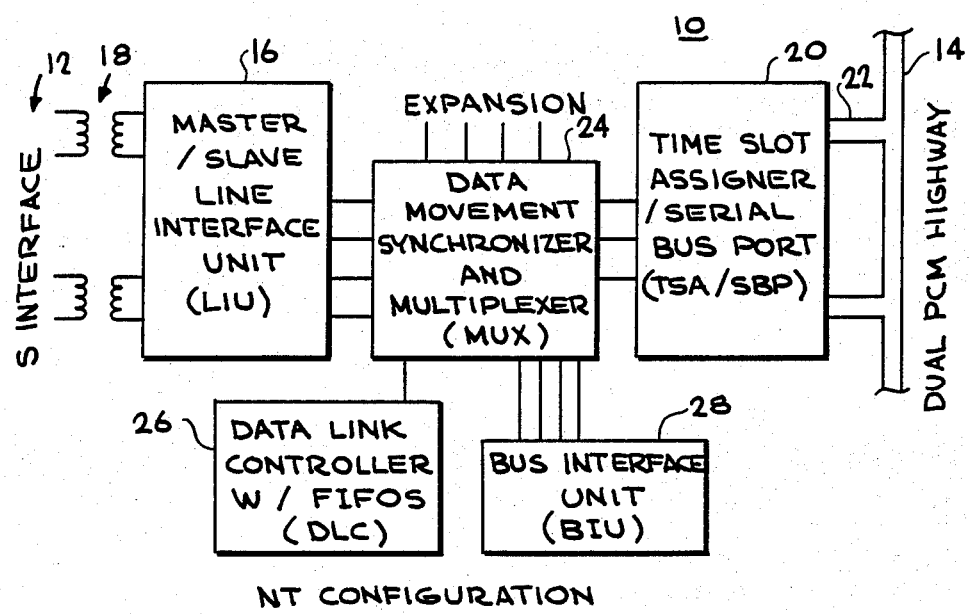
FIG. 1 is a block diagram of a Master/Slave Digital Exchange Controller (M/S DEC) 10, employing a synchronizing multiplexer of the instant invention, deployed in a Network Termination (NT) equipment.

FIG. 1 illustrates a Master/Slave Digital Exchange Controller (M/S DEC) 10 employing the synchronizer of the instant invention. FIG. 1 illustrates the M/S DEC 10 employed in NT equipment providing a link between an "S" interface 12 and a dual PCM Highway 14. The M/S DEC 10 is preferably fabricated as a single integrated circuit having the five functional blocks shown in FIG. 1.

A line interface unit (LIU) block 16 is connected to the "S" interface 12 via a full-duplex four-wire connection 18. A time-slot assigner/serial bus port (TSA/SBP) block 20 is connected to the dual PCM Highway 20 via bidirectional busses 22. A data-routing multiplexer (MUX) and data movement synchronizer 24 serves as a junction for data being routed between LIU 16 and TSA/SBP 20, as well as for the other blocks shown in FIG. 1; a data link controller (DLC) block 26 and a bus interface unit (BIU) block 28.

The LIU 16, TSA/SBP 10, DLC 26 and BIU 28 blocks within the M/S DEC 10 are described in the related, co-pending applications and such description is incorporated by reference herein; the BIU 28 is denoted the Microprocessor Interface (MPI) in the co-pending applications. The data-routing aspect of data movement synchronizer/Mux 24 is also described in these applications and such description is incorporated by reference herein. A description of the data movement synchronizer/MUX 24 in its other aspects will be presented herein.

The deployment of the M/S DEC 10 between the "S" interface 12 and the dual PCM Highway 14 is typical of its use in either the Master/Slave or the Slave/Slave Mode.

Figure 2:
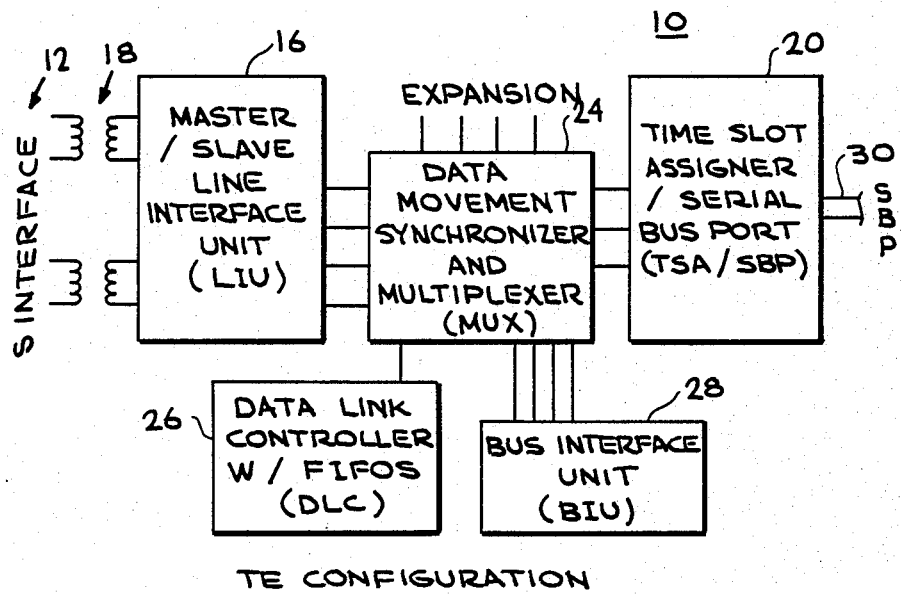
FIG. 2 is a block diagram of a M/S DEC 10, employing a synchronizing multiplexer, deployed in Terminal Equipment (TE).

With reference to FIG. 2, the M/S DEC 10 is shown in a typical subscriber side TE deployment operating in the slave mode. The various blocks comprising the M/S DEC are as shown in FIG. 1, however, the TSA/SBP block 20 is employed to use its Serial Bus Port (SBP) 30. The SBP 30 provides user access to the B and D channels, as is described in the related, co-pending application entitled "Digital Subscriber Controller". Such description is incorporated by reference herein.

When the M/S DEC 10 is used in TE (FIG. 2) a Subscriber Power Controller (SPC), an Integrated Data Protocol Controller (IDPC) and a microprocessor are typically required. The related, co-pending applications contain descriptions of an SPC and an IDPC and are incorporated by reference herein.

When the M/S DEC 10 is used in NT equipment (FIG. 1), a Quad Exchange Power Controller (QEPC) and a microprocessor are typically required. The related, co-pending application contains a description of a QEPC and is incorporated by reference herein.

Figure 3:
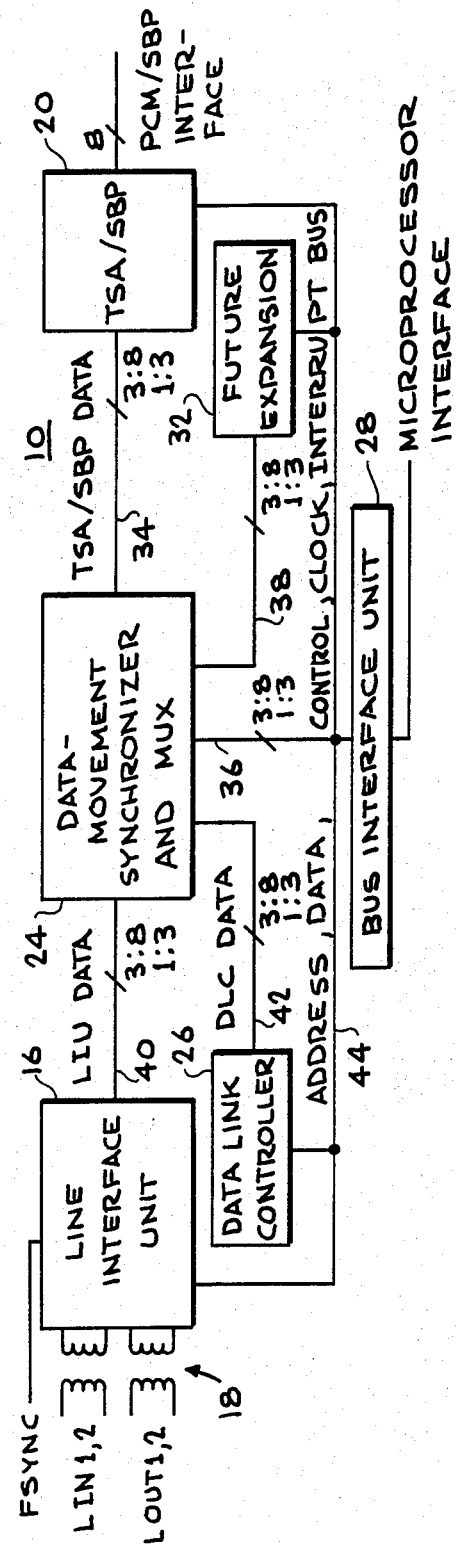
FIG. 3 is a block diagram of M/S DEC 10 employing the synchronizing multiplexer 24 of the instant invention.

With reference now to FIG. 3, the M/S DEC 10 is shown in block diagram form emphasizing that the individual functional blocks comprising the M/S DEC are interconnected by the MUX 24. The MUX 24 is a five-port device allowing up to four separate channels to be connected via each port to the other blocks of the M/S DEC. A block 32 labelled FUTURE EXPANSION in FIG. 3 such as a Main Audio Process (MAP) completes the five functional blocks interconnected by MUX 24.

In a preferred embodiment, a set of four bidirectional busses 34 interconnect the TSA/SBP 20 and MUX 24. A set of four bidirectional busses 36 interconnect the BIU 28 and the MUX 24 and a set of four bidirectional busses 38 interconnect the FUTURE EXPANSION block 32 with MUX 24, and a set of four bidirectional busses 40 interconnect the LIU 16 with the MUX 24. Each of the bidirectional busses consists of eight signal lines which allow parallel transmission of data in eight-bit blocks. The DLC 26 is interconnected to MUX 24 by a single bus 42 consisting of a single signal line.

The BIU 28 bus 36 also provides a communication link with an external microprocessor for all the five functional blocks 16, 20, 24, 26 and 32. This link is established by way of bus 36 for the MUX 24 and by way of separate address, data, control, clock and interrupt bus 44 interconnecting blocks 16, 20, 26 and 32 with BIU 28. The BIU 28 provides the first level of address decoding for user access to registers within the five functional blocks. Interrupt requests from each functional block are routed through the BIU 28. These aspects of the M/S DEC 10 are described in the related, co-pending application "Programmable Data-Routing Multiplexer" and such description is incorporated by reference herein.

The MUX 24 contains eight user-accessible registers, described in Table I. These registers are addressed via BIU 28 using the addresses shown in Table I. The first five registers listed in Table I are used to specify data-routing. The next register listed is used to report frame slippage, to enable the frame slip interrupt, and to store the hardware revision number of the MUX 24. The seventh register is used to specify the source of the clocks applied to the MUX 24 and the eighth register is used to report the alignment of clocks that are associated with an alignment buffer.

TABLE I

| ADDRESS | REGISTER | BITS |
|---|---|---|
| 000 | Path 1 Routing Control register | 8 |
| 001 | Path 2 Routing Control register | 8 |
| 010 | Path 3 Routing Control register | 8 |
| 011 | Path 4 Routing Control register | 8 |
| 100 | Path 5 (S) Routing Control register | 6 |
| 101 | Clock Alignment Interrupt register/REV | 8 |
| 110 | Clock Source Register | 5 |
| 111 | Clock Alignment register | 7 |

In addition to the data paths 34, 38, 40, and 42, the MUX 24 interconnects clock paths to and from the various blocks (LIU 16, MAP 32, DLC 26, TSA/SBP 24, and BIU 28). These interconnections are user programmable via the five MUX Routing Control registers and the clock Source register described in connection with Table I. The MUX 24 allows for the interconnection of two synchronous blocks that are asynchronous with respect to each other, i.e., the TSA/SBP 20 (slave to the PCM Highway) and the LIU 16 (operated as a slave to the "S" interface). The frame clock alignment can be monitored between these two asynchronous clocks.

The MUX 24 is organized as five ports, with each port having four independent input/output (I/O) channels. Each of the ports is connected to one block shown in FIG. 3. Three of the four I/O channels are used for routing B and D channel data, the fourth channel is used for routing the Spare bits (multiframming). The interconnection (routing) between two channels is called a path. The routing control for the three B/D channels is processed separately from the routing control for the Spare channel.

The ports of the MUX 24 are allocated to the blocks shown in FIG. 3 as listed in Table II.

TABLE II

| PORT # | USE |
|---|---|
| 1 | LIU 16 |
| 2 | TSA/SBP 20 |
| 3 | LIU 16 or MAP 32 |
| 4 | BIU 28 |
| 5 | DLC 26 |

Four channels are associated with each port of MUX 24 and identified by letters A, B, C and S as shown in Table III.

TABLE III

| CHANNEL DESIGNATION | USE |
|---|---|
| A | B1 CHANNEL |
| B | B2 CHANNEL |
| C | D or B3 (AP) CHANNEL |
| S | SPARE (MULTIFRAME) CHANNEL |

Data is moved through the MUX 24 in byte blocks, at a data rate of 8K bytes per second except for the LIU D channel which only has 2 bits per byte. The clocks that control the movement of data to and from the MUX are asynchronous to the clock used to move data through the MUX.

Figure 4A:
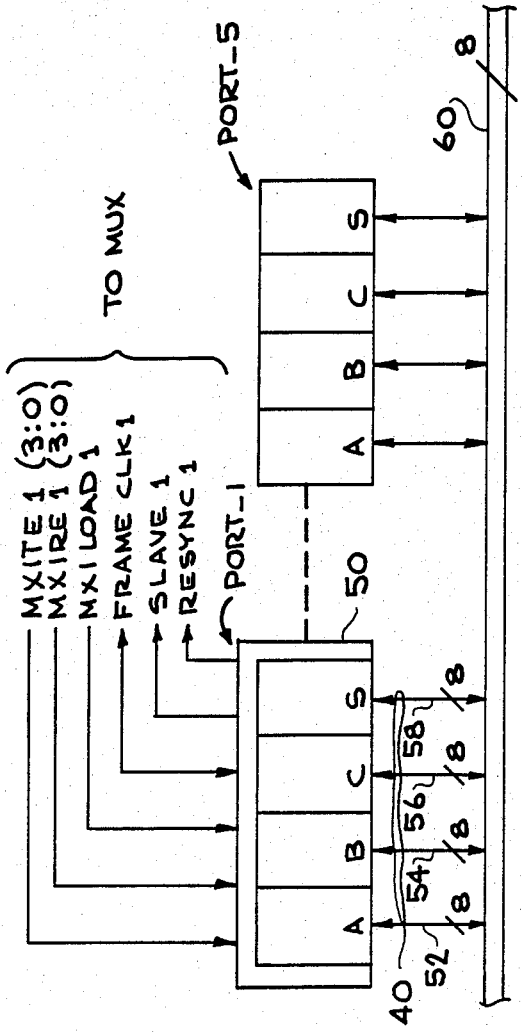

FIG. 4 is a unitary block diagram of the frame alignment MUX 24 of M/S DEC 10; FIG. 4B showing all its major elements other than the data-routing multiplexer portion and its related blocks, which are shown in FIG. 4A.

Data signals are received and generated at one of five ports, a representative one of which, PORT_1, is shown in FIG. 4A in detail. As described hereinabove, in connection with FIG. 3, and Table II, each port is connected in a preferred embodiment to a device as shown in FIG. 3. Data signals to be generated or received from a device are conducted to a port, such as PORT_1, 50, on channels shown in Table III. In an exemplary embodiment, channels A, B and C are eight-bit parallel channels 52, 54 and 56, respectively and channel S 58 is a three-bit parallel channel. (The channels 52, 54, 56 and 58 are shown in FIG. 3 collectively as bidirectional bus 40).

The A, B, C and S channels from each port are connected to a multiplexer portion of MUX 24 by a bidirectional eight-conductor MUX DATA BUS (MXD[7:0]) 60. Bus MXD[7:0] 60 carries the signals between each port in a time-division multiplexed (TDM) manner, under control of synchronizing signals MX1LOAD1, FRAMECK1 and RESYNCH1, in the case of PORT_1. The first two of these synchronizing signals MX1LOAD1, FRAMECK1 are generated by the clock multiplexer portion of MUX 24 as will be described below in connection with FIG. 4B. The latter synchronizing signal is generated by PORT_1 50. The other four ports receive and generate analogous synchronizing signals permitting TDM conduction of signals from all ports on the MXD[7:0]60. The structure internal to a port, such as PORT_1 50, shown in FIG. 4A will be described below in connection with FIG. 5.

Data signals are conducted between PORT_1 50 and the device connected to PORT_1 each channel employing a transmit enable signal MX1TE1[3:0] and a receive enable signal MX1RE1[3:0] shown in FIG. 4A. These signals are conducted to and from, respectively, a PORT DECODE block of MUX 24.

A SLAVE1 signal is generated by PORT_1 50 and conducted to the CLOCK MULTIPLEXER of MUX 24. This signal indicates whether PORT_1 is operating as a master or slave port. The FRAME CLOCK1 signal is generated by PORT_1 50 if the port is a slave, and is received by PORT_1 from the CLOCK MULTIPLEXER if the port is a master. The RESYNCH1 signal is generated by PORT_1 to request resynchronization of a STATE MACHINE portion of MUX 24. The MX1LOAD1 is generated by the CLOCK MULTIPLEXER and causes loading of transmit and intermediate receive registers within PORT_1 50 as described in an Appendix attached hereto.

With reference now to FIG. 4B, frame alignment MUX 24 includes a clock multiplexer (CLOCK_MUX) 100, user-accessible registers 102, a state machine 104, a state counter 106, a state-machine timer 108, and a port decoder 110. CLOCK_MUX 100 and PORT_DECODE 110 generate multiplex load (MX1LOAD i [3:0]) and, multiplex transmit enable (MX1TE i [3:0]) and multiplex receive enable (MX1RE i [3:0]) SIGNALS, i=1, 2, 3, and 5, respectively, to the data-routing multiplexer (FIG. 4A) for ports 1, 2, 3 and 5, respectively, shown in Table II. Each signal consists of four individual signals MX1LOAD ij, MX1TE ij, MX1RE ij, j=0, 1, 2 and 3 corresponding to the four channels shown in Table III.

CLOCK_MUX 100 also receives and generates frame clock (FRAMECK i) signals, i=1, 2, 3 and 5 which are used to synchronize data movement through the data-routing multiplexer for each of the ports 1, 2, 3, and 5, respectively. SLAVE i signals, i=1, 2, 3 and 5 and resynchronize (RESYNC i) signals, i=1, 2, 3 and 5 are received by the CLOCK_MUX 100. A complete description of the signals shown on FIG. 4B is contained in an Appendix appended hereto.

MX1TE4[3:0], MX1RE4[3:0] are generated by PORT_DECODE 110 and received by Register block 102 and MX1LOAD4, FRAMECK4, SLAVE4 and RESYNC4 signals are used internally by register block 102. These signals correspond to the transmit enable, receive enable, load, frame clock, slave and resynchronize signals for the fourth port; i.e., the BIU 28. Register block 102, in turn, generates signals on the address, data, control, clock and interrupt bus 44 including BIU data (BIUD[7:0]), BIU address (BIUAD[3:0]), BIU interrupt (BIUINT), (BIUSELBIU), (BIUSELMX), BIU write (BIUWR) and BIU read (BIURD). Register block 102 generates clock source (CLKSRC[4:0]) and signals to the PORT_DECODE 110 and CLOCK MUX 100.

CLOCK_MUX 100 generates a CLOCK 1 and a CLOCK 2 signal conducted to the STATE_MACH 104 via clock bus 111. These two clock signals are recovered clocks from slave port devices and are provided to master port devices. Selection of the port devices to supply each of the signals is by user-supplied bits in a Clock Source register within block 102. A user-programmed microprocessor writes the bits via BIU 28 into the Clock Source Register. Clock Source CLKSRC[4:0] signal lines conduct the contents of the Clock Source Register to PORT_DECODE 110.

A port device that is operating as a slave will generate a clock strobe by dividing a 6.144 MHz system clock down to 8 KHz, synchronized to the recovered frame clock.

If either clock source device lengthens a clock period or stops the clock together, a Resync Request (RESREQ) signal will be generated by CLOCK MUX 100 line at or before the time of the first missing clock.

Whenever a block is a master, it receives its timing signal from one of two clocks CLOCK1 or CLOCK2. The selection of which clock to use is specified by the Clock Source register.

Each clock signal CLOCK i (i=1 or 2) is conducted to STATE_MACH 104 via the CLOCK i bus 111. The strobe from CLOCK i bus is latched into a clock flag, CFi (i=1 or 2). These two flags are used as inputs to the Data Movement and Clock Unit described in connection with FIG. 6 so that it can control data transfers between devices operating on different clocks.

Figure 5:
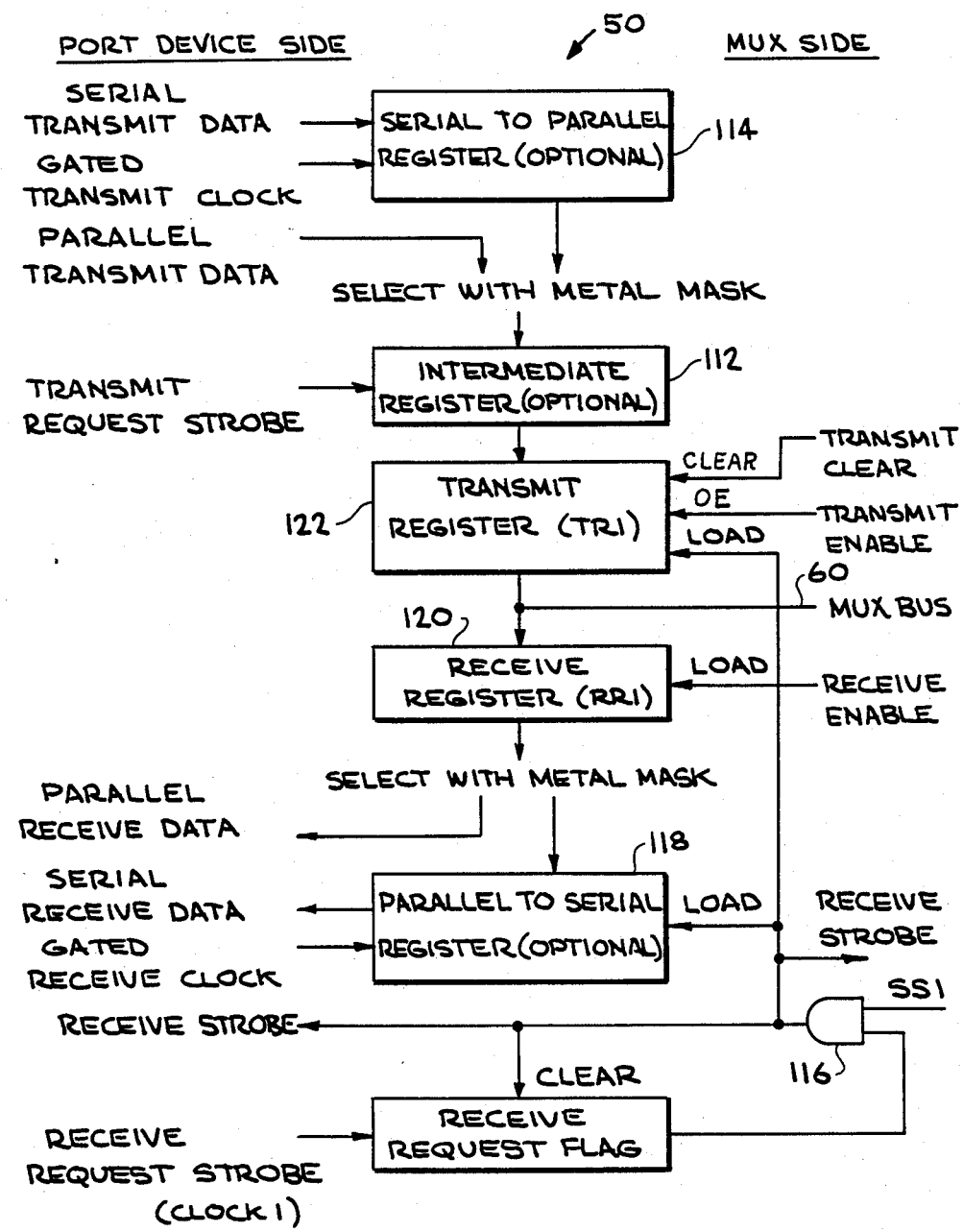
FIG. 5 is a block diagram of the input/output structure employed by MUX 24.

FIG. 5 is a block diagram of the MUX 24 input/output (I/O) structure showing a representative receive-side and transmit-side of a port, such as port 50, shown in FIG. 4A. A data path is associated with each clock, CLOCK1 and CLOCK2. One such data path is shown in FIG. 5. Certain of the blocks shown in FIG. 5 are indicated as optional: which of the optional blocks are deleted depends on the device connected to the port.

Ports 2 (TSA) and 4 (BIU) receive and transmit data in parallel, eight bits at a time. Port 5 (DLC) receives and transmits data serially in two or eight bit bursts as indicated by a flag. Ports 1 and 3 can receive and transmit data either serially or in parallel (eight bits at a time) according to a metal mask used during fabrication of the circuit.

If a port 50 sends data to the MUX in serial form, it must provide a gated clock for each channel. After all of the data has been sent to the MUX, whether in serial or parallel form, the port block sends a transmit request strobe MX1LOAD1 to the MUX. This moves the data into an intermediate register 112. In the case of a parallel interface this data comes directly from the port. In the case of a serial interface this data comes from a serial to parallel register 114. If the port device provides a parallel input, the serial to parallel register can be deleted.

If a port device receives data from the MUX in serial form, it must provide a gated clock for each channel. The port device must also send its clock strobe as a receive strobe for each channel, whether serial or parallel. The receive strobe is latched into a receive request flag of the port channel via AND gate 116. The MUX logic monitors each receive request flag. If it is set when the MUX reaches the appropriate step (SS1—described in connection with FIG. 6) in its cycle, MUX 24 sends a receive strobe to load the parallel to serial register 118 of a serial port or the parallel input of a parallel port from a receive register 120 of the MUX. The receive strobe signal also causes loading of the transmit data from the intermediate register 112 into a transmit receiver 122 of the MUX.

If the port device has a parallel interface, the parallel to serial registers 118 can be omitted. If the port device transmits and receives simultaneously, the intermediate registers can also be deleted. In this case, the transmit data must be available before the receive request strobe and must remain available until after the receive strobe.

Figure 6:
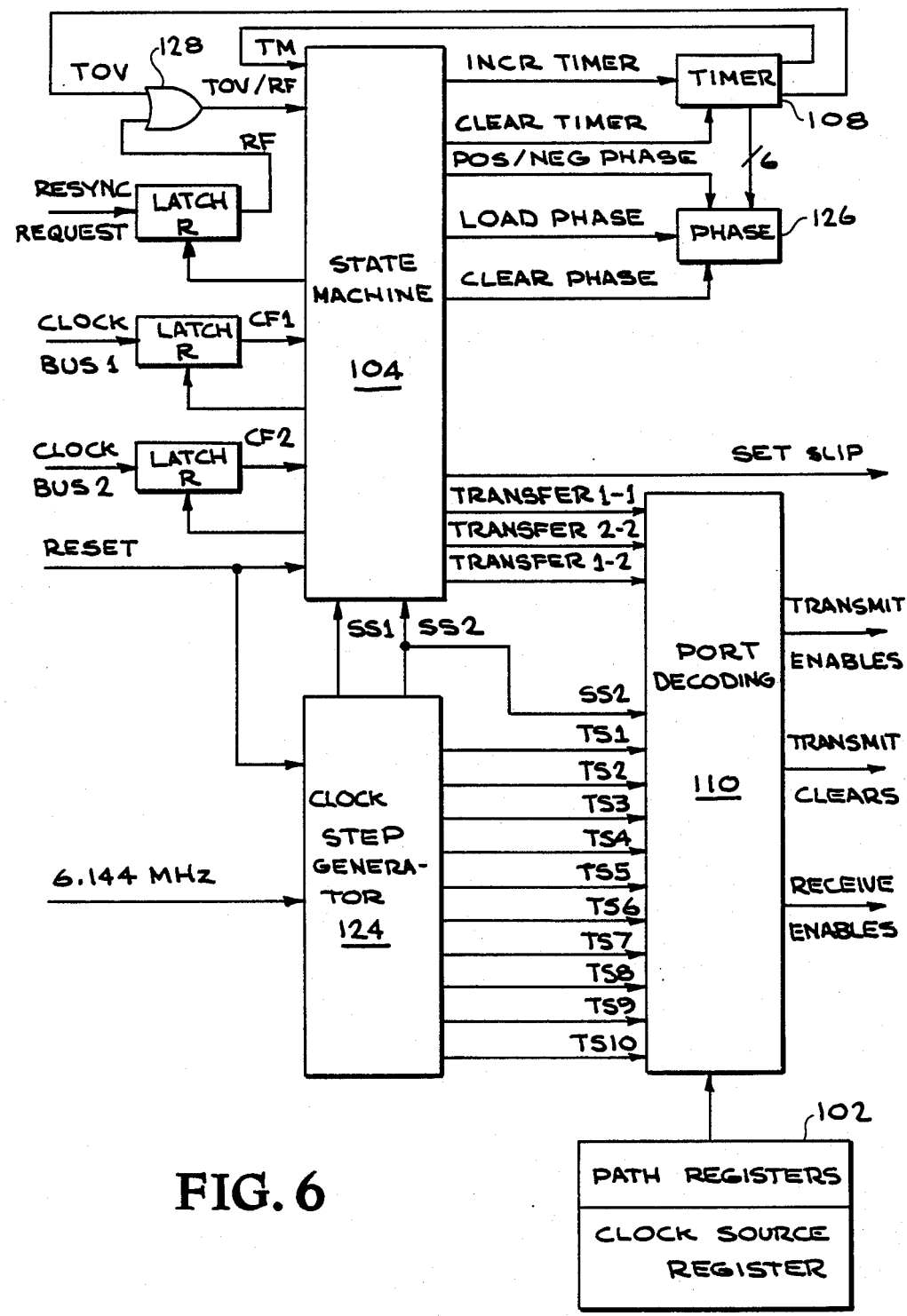
FIG. 6 is a block diagram of the data movement synchronizer portions of the MUX 24.

FIG. 6 is a block diagram of the Data Movement and Clock Alignment Unit portion of MUX 24, comprising portions of register block 102, port decode block 110, state machine 104, timer 108, a portion of state counter 106 shown in FIG. 6 as a clock step generator 124 and a phase block 126.

The Data Movement and Synchronizer Unit 24 can establish up to five paths having four channels A, B, C and S. At the interface to each channel there is a transmit 122 and a receive 120 data receiver to buffer the data and interfacing logic shown in FIG. 5. Paths are established on a time multiplexed bus under control of a state machine 104. This state machine has its own timer 108. At the beginning of each transfer cycle, the state machine examines the clock flags CF1 and CF2 from the two clocks, CLOCK1 and CLOCK2, plus flags from the timer. Based on this time state machine moves to a new state and controls the movement of data on the paths through the MUX. The state machine also controls the timer 108 and updates the data available to the user such as a phase and a slip indicator.

The state machine 104 receives a 6.144 MHz clock. One cycle of the state machine consists of 12 clock cycles for a basic rate of 512 KHz. Ten of the clock cycles are used to transfer data and are referred to as Transfer Steps (TS1-TS10). Two clock cycles can be used to step the state machine and are referred to as State Steps (SS1, SS2). The order of generation of these signals is: SS1, SS2, TS1-TS10. A reset signal moves the state machine to SS1. Data transfers from the intermediate registers 112 to the transmit registers 122 or from the receive registers 120 to the parallel-to-serial registers 118 are done on the SS1 step following the appropriate clock strobe.

During each TSj step data from the appropriate data channel is presented on the bus. The order of data presentation on the ten TS steps is first end of path 1, second end of path 1, first end of path 2, etc. Data is presented on the bus at every TS step; however, the data is not loaded into the receive registers 120 unless the state machine has issued a receive command for the relevant type of transfer as will now be described.

Each data path (shown in FIG. 5) contains the following for each path end (i=1 or 2):
TRi—Transmit Register i (9 bits) 122
RRi—Receive Register i (9 bits) 120

The transmit register 122 latches data coming from the intermediate register 112 on an SS1 clock cycle following a strobe on the appropriate clock bus. The data will be placed on the MUX BUS 60 during the appropriate TSj clock cycle.

The receive register 120 latches the data from the bus during the appropriate TSj clock cycle if the state machine 104 has given a transfer command for the type of transfer involved. There are three types of transfer with a command bit for each:

(1) between CLOCK1 devices corresponding to a TRANSFER 1-1 signal generated by STATE_MACH 104;
(2) between CLOCK2 devices corresponding to a TRANSFER 2-2 signal generated by STATE_MACH 104;
(3) between CLOCK1 and CLOCK 2 devices corresponding to a TRANSFER 1-2 signal generated by STATE MACH 104.

The data is then available to the device connected to the channel. When the receive strobe occurs, the channel must read the data from the Receive Register 120 either to its own parallel register or to the parallel-to-serial register 118. The transmit registers 122 are cleared upon reset.

The state machine 104 has its own timer 108. The state machine 104 generates an increment timer (INCR TIMER) signal received by TIMER 108. The timer is a counter which is available to the state machine. The timer receives its incrementation signal at the same time the state transition occurs unless the state machine clears the timer. The timer is a six-bit counter which counts from 0 to 63 and remains at 63 until it is cleared.

There are two status flag signals generated by the timer, timer midpoint (TM) and timer overflow (TOV). The TM flag is ONE when timer=32 and ZERO otherwise. The TOV flag is set to a ONE if the timer 108 receives an incrementation twice after it has reached 63. TOV and TM are cleared at the same time as the timer. As the timer 108 is incremented the sequence shown in Table IV occurs:

TABLE IV

| TIMER | TM | TOV |
|---|---|---|
| 0-31 | 0 | 0 |
| 32 | 1 | 0 |
| 33-62 | 0 | 0 |
| 63 | 0 | 0 |
| 63 | 0 | 0 |
| 63 | 0 | 1 |
| ETC. | 0 | 1 |

Since the state machine 108 operates at 512 KHz, TOV will be set 127 microseconds after the timer is cleared.

Timer 108 generates signals to a user-accessible clock-alignment register in block 102 regarding the relative phase between CLOCK1 and CLOCK2 signals. Time between CLOCK1 and CLOCK2 is measured in 512 KHz clock cycles.

Bits 1-5 Magnitude (TIMER[5:0]). A SIGN signal is generated by STATE_MACH 104 and conducted to Bit 6 (Sign) of the clock-alignment register signifying
0=Mode A: CLOCK 1 leads CLOCK 2
1=MODE B: CLOCK 1 lags CLOCK 2.
Phase magnitude will be read as 0 if the path is not synchronized.

A SLIP signal is generated by STATE_MACH 104 and conducted to a user-accessible clock alignment interrupt register. The 1 bit SLIP indicator is set to 1 a frame after the occurrence of a slip. It is set to a 0 when read by the user or upon reset.

The state machine 104 generates to PORT_DECODE 110 the followings signals to control the receive registers 120:
Transfer 1-2: Load receive registers 120 on all paths between CLOCK1 and CLOCK2 devices;
Transfer 1-1: Load receive registers 120 on all paths between CLOCK1 devices;
Transfer 2-2: Load receive registers 120 on all paths between CLOCK2 devices;
Clear 1: Clear transmit registers 122 on all CLOCK1 devices;
Clear 2: Clear transmit registers 122 on all CLOCK2 devices.

The state machine 104 generates one signal on the TIMER 108:

Clear timer (CLRTIMER) (TIMER, TM and TOV signals set to 0).

The state machine 104 receives a Resync Request Flag (RF) which indicates a clear resync operation (Resync Flag set to 0). The RF signal is applied to a first input of an OR gate 128. A second input of OR gate 128 receives the TOV signal generated by TIMER 108 and a TOV/RF signal is generated therefrom and is applied to STATE_MACH 104. The state machine 104 can take the following actions which affect the user accessible registers:

Load positive phase: by generating a load phase (LDPHASE) signal received by registers 102 magnitude bits of PHASE (TIMER [5:0]) are loaded from TIMER; sign bit is set to 0.

Load negative phase: by generating the LDPHASE signal magnitude bits of PHASE are loaded from TIMER; sign bit is set to 1.

Clear Phase: by generating the LDPHASE signal and set PHASE magnitude to 0.

Set Slip: Set the SLIP indicator in the status register and trigger an interrupt.

The state machine 104 makes a transition once per 512 KHz cycle. At the same time that it is updated it latches the bits which control the path registers. The operation of the state machine 104 is best understood by reference to FIG. 7, a state-transition diagram.

In the following description of the state-transition diagram of FIG. 7, the terms A mode and B mode are used to mean:

A mode—CLOCK1 is assumed to lead CLOCK2 and phase is measured from CLOCK1 to CLOCK2 as a positive quantity. Data transfers between asynchronous devices are done after any CLOCK2 strobe which leaves the machine in the A mode. Two successive CLOCK1 strobes causes a data error.

B mode—CLOCK1 is assumed to lag CLOCK2 and phase is measured from CLOCK2 to CLOCK1 as a negative quantity. Data transfers between asynchronous devices are done after any CLOCK1 strobe which leaves the machine in the B mode. Two successive CLOCK2 strobes causes a data error.

Figure 7:
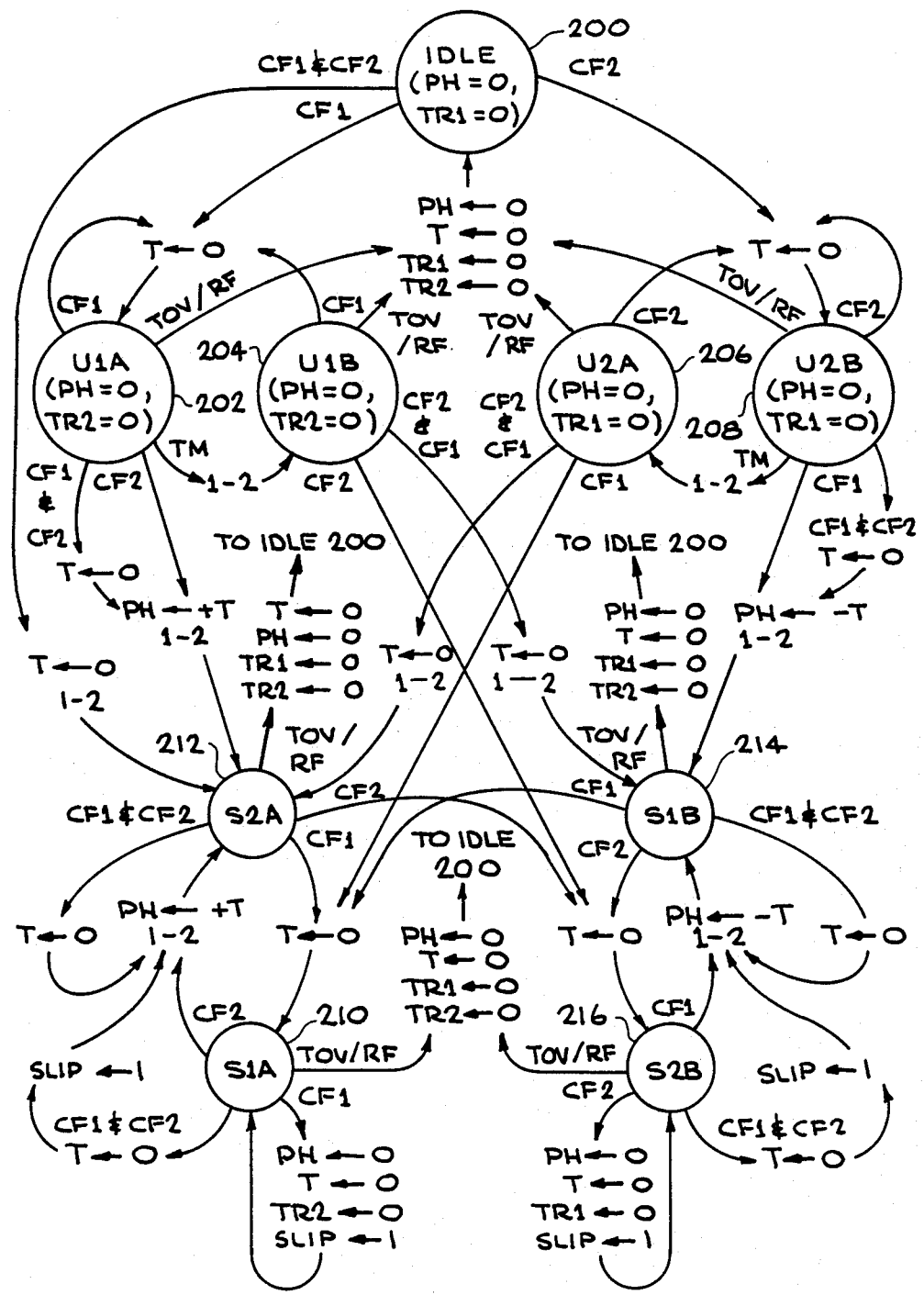
FIG. 7 is a state transition diagram of the state machine controlling the data movement synchronizer portion of MUX 24.

The distinction between "A mode" and "B mode" in the following description to FIG. 7 is essential, because the mode determines the sign of the phase and the clock on which data transfers between data streams operating on different clocks, CLOCK1 and CLOCK2. Generally, the states (other than the IDLE state) can be described by three attributes:

(1) A or B mode described above;
(2) 1 or 2 depending on whether CLOCK1 and CLOCK2, respectively, occurred last;
(3) unsynchronized or synchronized depending on whether one or two clocks, respectively, are operating.

The IDLE state means neither clock is operating.

In normal operation the state machine 104 will start up in the IDLE state 200. When activity is detected on a clock, the state machine 104 passes to the appropriate start-up state, U1A for CLOCK1 only, or U2B for CLOCK2 only. State machine 104 then alternates between the A and B modes until activity is detected on the other clock. State machine 104 then passes to an appropriate synchronized mode (S1A, S2A, S1B, or S2B). If an access occurs too later for proper data transfer, the machine sets the slip interrupt signal.

A Resync Request strobe will force the state machine back to the IDLE state 200.

The meaning of each state shown in FIG. 7 is as follows:

IDLE state 200: This is the default state when neither clock, CLOCK1 or CLOCK2, is active. PHASE 126, TIMER 108 and Transmit Registers 122 are all set to zero when this state is entered.

U1A state 202: Only CLOCK1 is active, and less than ½ frame has passed since the last CLOCK1 strobe. If CLOCK2 becomes active, the state machine will synchronize in the A mode. PHASE 126 and CLOCK2 Transmit Registers are zero in this state.

U1B state 204: Only CLOCK1 is active, and more than ½ frame has passed since the last CLOCK1 strobe. If CLOCK2 becomes active, the state machine will synchronize in the B mode. PHASE and CLOCK2 Transmit Registes are zero in this state.

U2A state 206: Only CLOCK2 is active, and more than ½ frame has passed since the last clock 2 strobe. If CLOCK1 becomes active, the state machine will synchronize in the A mode. PHASE and CLOCK1 Transmit Registers are zero in this state.

U2B state 208: Only CLOCK2 is active, and less than ½ frame has passed since the last CLOCK2 strobe. If the CLOCK1 becomes active, the state machine will synchronize in the B mode. PHASE and CLOCK1 Transmit Registers are zero in this state.

S1A state 210: The state machine 104 is synchronized in the A mode and the last access was on CLOCK1.

S2A state 212: The state machine 104 is synchronized in the A mode and the last access was on CLOCK2.

S1B state 214: The state machine 104 is synchronized in the B mode and the last access was on the CLOCK1.

S2B state 216: The state machine 104 is synchronized in the B mode and the last access was on CLOCK2.

Signals applied to state machine 104 determine the next state to which state machine 104 will transit, as shown in FIG. 7. These input signals are shown adjacent to directed lines leaving a state and terminating on another state. With reference to Table V, below, which summarizes the input/output relationships in FIG. 7, inputs to each state are listed in order of precedence; i.e., if two inputs occur in one cycle the first input listed determines the action. An exception is the compound input, CF1 and CF2, which is listed as a separate event. The default state after a reset is IDLE. Reset also clears PHASE, TIMER, Transmit Registers and SLIP.

Outputs are shown on the FIG. 7 placed in the directed line segments which call for the state machine 104 to generate signals including (TIMER (T), PHASE (PH), Transmit Register (TR1, TR2), SLIP, TRANSFER 1-1, 1-2, 2-2).

In addition to the outputs listed in Table V are three default outputs. After every CF1 input, an output will be generated to transfer data between CLOCK1 devices. After every CF2 input, an output will be generated to transfer data between CLOCK2 devices. In every cycle without a "clear timer" command, the timer will increment. "*" in front of an input signifies an impossible input.

TABLE V

| STATE | INPUT (S) | NEXT STATE | OUTPUT (S) |
|---|---|---|---|
| IDLE | CF1 & CF2 | S2A | Clear timer, transfer 1-2. |
| IDLE | CF1 | U1A | Clear timer. |

TABLE V-continued

| STATE | INPUT (S) | NEXT STATE | OUTPUT (S) |
|---|---|---|---|
| IDLE | CF2 | U2B | Clear timer. |
| U1A | TOV/RF | IDLE | Clear phase, clear timer, clear transmit 1, clear transmit 2, clear resync. |
| U1A | CF1 & CF2 | S2A | Clear phase, clear timer, transfer 1-2. |
| U1A | CF1 | Same | Clear timer. |
| U1A | CF2 | S2A | Load positive phase, transfer 1-2. |
| U1A | TM | U1B | Transfer 1-2. |
| U1B | TOV/RF | IDLE | Clear phase, clear timer, clear transmit 1, clear transmit 2, clear resync. |
| U1B | CF1 & CF2 | S1B | Clear timer transfer 1-2. |
| U1B | CF1 | U1A | Clear timer. |
| U1B | CF2 | S2B | Clear timer. |
| U2A | TOV/RF | IDLE | Clear phase, clear timer, clear transmit 1, clear transmit 2, clear resync. |
| U2A | CF1 & CF2 | S2A | Clear timer, transfer 1-2. |
| U2A | CF1 | S1A | Clear timer. |
| U2A | CF2 | U2B | Clear timer. |
| U2B | *TOV/RF | IDLE | Clear phase, clear timer, clear transmit 1, clear transmit 2, clear resync. |
| U2B | CF1 & CF2 | S1B | Clear phase, clear timer, transfer 1-2. |
| U2B | CF1 | S1B | Load negative phase, transfer 1-2. |
| U2B | CF2 | Same | Clear timer. |
| U2B | TM | U2A | Transfer 1-2. |
| S1A | TOV/F | IDLE | Clear phase, clear timer, clear transmit 1, clear transmit 2, clear resync. |
| S1A | CF1 & CF2 | S2A | Clear phase, clear timer, transfer 1-2, set slip. |
| S1A | CF1 | Same | Clear timer, clear transmit 2. |
| S1A | CF2 | S2A | Load positive phase, transfer 1-2. |
| S2A | TOV/RF | IDLE | Clear phase, clear timer, clear transmit 1, clear transmit 2, clear resync. |
| S2A | CF1 & CF2 | Same | Clear phase, clear timer, transfer 1-2. |
| S2A | CF1 | S1A | Clear timer. |
| S2A | CF2 | S2B | Clear timer. |
| S1B | TOV/F | IDLE | Clear phase, clear timer, clear transmit 1, clear transmit 2, clear resync. |
| S1B | CF1 & CF2 | Same | Clear phase, clear timer, transfer 1-2. |
| S1B | CF1 | S1A | Clear timer. |
| S1B | CF2 | 2B | Clear timer. |
| S2B | TOV/RF | IDLE | Clear phase, clear timer, clear transmit 1, clear transmit 2, clear resync. |
| S2B | CF1 & CF2 | S1B | Clear phase, clear timer, transfer 1-2, set slip. |
| S2B | CF1 | S1B | Load neative phase, transfer 1-2. |
| S2B | CF2 | Same | Clear phase, set slip, clear timer, clear transmit 1. |

In the preferred embodiment, the phase resolution was set by the need to multiplex five full duplex channels with the time division multiplexed bus 60 operating at 6.144 MHz. Twelve clock cycles were allowed for one state machine cycle. Ten clock cycles handle the 5 duplex data paths and two clock cycles do the state machine update. This leaves the state machine with a basic rate of 6.144 MHz/12=512 KHz. Since the data clock rate is 8 KHz, there are 64 state machine cycles for every data clock pulse, approximately.

If the maximum short term error of the crystal is N ppM, the time to drift one-half frame is $10^{**}6/2*N$ frames. The time to estimate the clock drift rate to N/2 ppM is $2*10^{**}6/N$ state machine cycles or 1/16 of the time to drift one-half frame. This makes it possible to estimate the clock error and correct it long before there is any danger of a data slip. With the numbers given and N assumed to be 10, a correction would be done every 390 ms and the correction would be less than 5 ppM.

The IDLE state is used as a start-up state after a reset, loss of clock, or request for resynchronization. The machine remains in the IDLE state until one of the clock flags, CF1 or CF2, is set.

Upon receipt of a clock flag in the IDLE state, the machine moves to an unsynchronized state (U1A or U2B) and clears the timer (T←O). The UXX states are used when only one clock is active. The number after the "U" indicates which clock is active; e.g., U1X indicates that only CLOCK1 is active (X=A or B).

While only one clock is active, the states alternate between UXA and UXB (x=1 or 2). For example, if CLOCK1 is active, U1A is appropriate before the timer midpoint and U1B is appropriate after.

U1A U1B U1A U1B

If a CLOCK2 occurs before the midpoint CLOCK1 is assumed to lead and mode A is corect. If CLOCK2 occurs after the midpoint, CLOCK2 is assumed to lead and mode B is correct.

The start-up procedure insures that at start-up the phase is between $\pm\frac{1}{2}$ frame.

Start-up in the proper state is necessary to maximize phase margin. If the machine were to be started with a phase of +62, for example, a drift of 1 unit would cause a data slip.

When the second clock occurs, the machine moves to the appropriate synchronized state (SXX). The number after the "S" tells which clock occurred last. The letter at the end indicates A mode or B mode. For example, S1A means synchronized in A mode with CLOCK1 as the last event. In moving from an unsynchronized to a synchronized state, the mode (A or B) remains unchanged.

Normally, the mode changes infrequently and the machine either alternates between S1A and S2A or between S1B and S2B as each clock occurs. Timing begins on the leading clock (CLOCK1 in mode A, CLOCK2 in mode B) and ends on the lagging clock. The time is recorded in the phase variable after the lagging clock. Data transfers between data streams on different clocks occur after the lagging clock.

There is only one way to move between the A and B modes. This is the phase to go through zero and change signs either from S1B to S1A (− to +) or from S2A to S2B (+ to −). This involves a change in the sign of the phase and the clock which controls transfers, but no data is lost.

If the phase magnitude increases until the lagging cock is overtaken by an earlier leading clock, data will be lost. When this happens, the phase is set back to zero, and the slip interrupt is set. Once a slip has occurred, the machine has an entire frame of phase margin.

There are three ways to get back to the IDLE state: (1) hardware reset; (2) timer overflow (TOV) indicating loss of clock, or (3) resync request flag (RF). The first two are self-explanatory. The resync request is sent by a clock source to warn the state machine that the next clock is going to occur at an irregular time. For example a deactivated telephone line will send a free-running clock. When the telephone is activated, the clock is synchronized to the telephone line.

In synchronizing to the telephone line, the phase of the clock must be changed abruptly. Forcing the state to IDLE restarts the paths with maximum phase margin and prevents erroneous slip interrupts.

Data transfers between data streams on the same clock all occur in the state machine cycle following the setting of the appropriate clock flag (CF1 or CF2). Data transfers between data streams on different clocks occur on the state machine cycle where a "transfer 1-2" command has been given by the state machine.

The MUX 24 Register block 102 contains eight registers. Five are used to specify routing. One is used to specify clock sources for each port. One is used to report frame slippage, enable the frme slip interrupt, and store the hardware revision number of the MUX. The eighth register is used to report the alignment of the clocks that are associated with the alignment buffer.

Each of the eight registers is accessible to a user via the BIU 38 by the addressing scheme shown in Table VI.

TABLE VI

| ADDRESS | REGISTER | BITS |
|---|---|---|
| 000 | Path 1 Routing Control register | 8 |
| 001 | Path 2 Routing Control register | 8 |
| 010 | Path 3 Routing Control register | 8 |
| 011 | Path 4 Routing Control register | 8 |
| 100 | Path 5 (S) Routing Control register | 6 |
| 101 | Clock Alignment interrupt register/REV | 8 |
| 110 | Clock Source Register | 5 |
| 111 | Clock Alignment register. | 7 |

Paths 1, 2, 3 and 4 Routing Control registers are within block 102 and are used to specify the points of interconnection for routing paths 1, 2, 3 and 4, respectively. The registers can be read and written to by the user via BIU 28. The default value at Reset is all zeros. Each register stores an eight-bit quantity, the most-significant four bits determine the port, and channel of that port, which is to be one end of the routing path and the least-significant four bits determine the port, and channel of that port, which is to be the other end of the routing path. The connection determined by the contents of a register is specified by a connection code shown in Table VII.

TABLE VII

| CONNECTION CODES FOR ROUTING CONTROL REGISTERS 1, 2, 3 | | |
|---|---|---|
| CONNECTION CODE | PORT | CHANNEL |
| 0000 | NO CONNECTION | |
| 0001 | 1 | A |
| 0010 | 1 | B |
| 0011 | 1 | C |
| 0100 | 2 | A |
| 0101 | 2 | B |
| 0110 | 2 | C |
| 0111 | 3 | A |
| 1000 | 3 | B |

TABLE VII-continued

| CONNECTION CODES FOR ROUTING CONTROL REGISTERS 1, 2, 3 | | |
|---|---|---|
| CONNECTION CODE | PORT | CHANNEL |
| 1001 | 3 | C |
| 1010 | 4 | A |
| 1011 | 4 | B |
| 1100 | 4 | C |
| 1101 | 5 | A |
| 1110 | 5 | B |
| 1111 | 5 | C |

If for example port 1 is connected to the LIU 16 and port 2 is connected to the TSA/SBP 20, and it is desired to establish a route to the B2 channel of the LIU to the B1 channel of the TSA/SBP, the first Routing Control register would be programmed with the codes for port 1B and port 2A—0010, 0100 and this connection would be made over path 1. If it is desired also to connect the LIU D channel to the DLC (port 5), the second Routing Control register would be programmed to contain the codes for port 1C and port 5C—0011, 1111 path 2 would be used. Any of the possible routing combinations can be programmed via any of the four Routing Control registers.

Path 5 Routing Control Register is also within block 102 and is used to specify the routing of the three Spare bits (S1, S2, FA) path. The register can be read or written by the user. The default at Reset is all zeros. This register stores an eight-bit quantity, the most-significant four bits determine the port which is the source of the fifth routing path and the least-significant four bits determine the port which is the destination of the fifth routing path. The connection determined by the contents of the register is specified by a connection code shown in Table VIII.

TABLE VIII

| CONNECTION CODES FOR ROUTING CONTROL REGISTER 5 | |
|---|---|
| PORT CODE | PORT (S CHANNEL) |
| 0000 | NO CONNECTION |
| 0001 | 1 |
| 0100 | 2 |
| 0111 | 3 |
| 1010 | 4 |
| 1101 | 5 |

If for example port 1 is connected to the LIU, and port 4 to the BIU, and it is desired to route the Spare bits between these two points, the register would be programmed with 0001, 1010.

A Clock Source register contains one bit position for each port; a least-significant bit position corresponding to Port 2, a most-significant bit position corresponding to Port 5. The bit associated with a given port is used to specify which of two clocks, CLOCK1 or CLOCK2, the block connected to the port is to use. If the block is a slave, deriving its clock externally, it drives the clock onto the selected clock bus. If two slaves attempt to drive the same clock bus the slave with the lower port number has priority. The default at reset is all zeros.

When a bit is set to one, the block connected to the corresponding port uses CLOCK2, when cleared, the block uses CLOCK1.

A Clock Alignment Interrupt register has three fields, one to report frame slippage, one to mask the interrupt caused by frame slippage, and one to report the hardware revision number.

A least-significant bit position of the register contains a Frame Slippage Indicator that data has been lost due to a miss-alignment of the data clocks associated with two ports, that exceeds the compensating capacity of the Alignment Unit. When this bit is set an interrupt is requested, assuming that the interrupt is enabled. The bit is cleared by reading the register or by reset. A write to this bit by the user will not affect the bit. A slip in either direction will set the slip bit, and the user's maintenance routine will examine the phase to determine what happened.

A next least-significant bit position of the register contains a Frame Slippage Interrupt Enable which is set by the user; the setting of the Frame slippage Indicator causes an interrupt to be requested. If the bit is cleared by the user or by reset, the setting of the Slippage Indicator will not generate an interrupt.

The most-significant four bit positions of the register contains a hardware revision number. For software reasons, it is necessary to provide a user readable indication of the revision level of the MUX. This hardwired field provides this information. The first version of the MUX will have all zeros in this field. Each subsequent version of the MUX, that is different from a software standpoint, will have a new revision number.

The relative phase between the CLOCK1 and CLOCK2 is reported in the clock Alignment Register (126 in FIG. 6). An increasing phase indicates that CLOCK1 is running faster than CLOCK2.

The phase error is encoded as sign and magnitude, with the magnitude phase error contained in the six least-significant bit positions and the sign bit contained in the seventh bit position. The register is written by the TIMER 108 and read by the user. The default at Reset is all zeros.

Figure 8A:
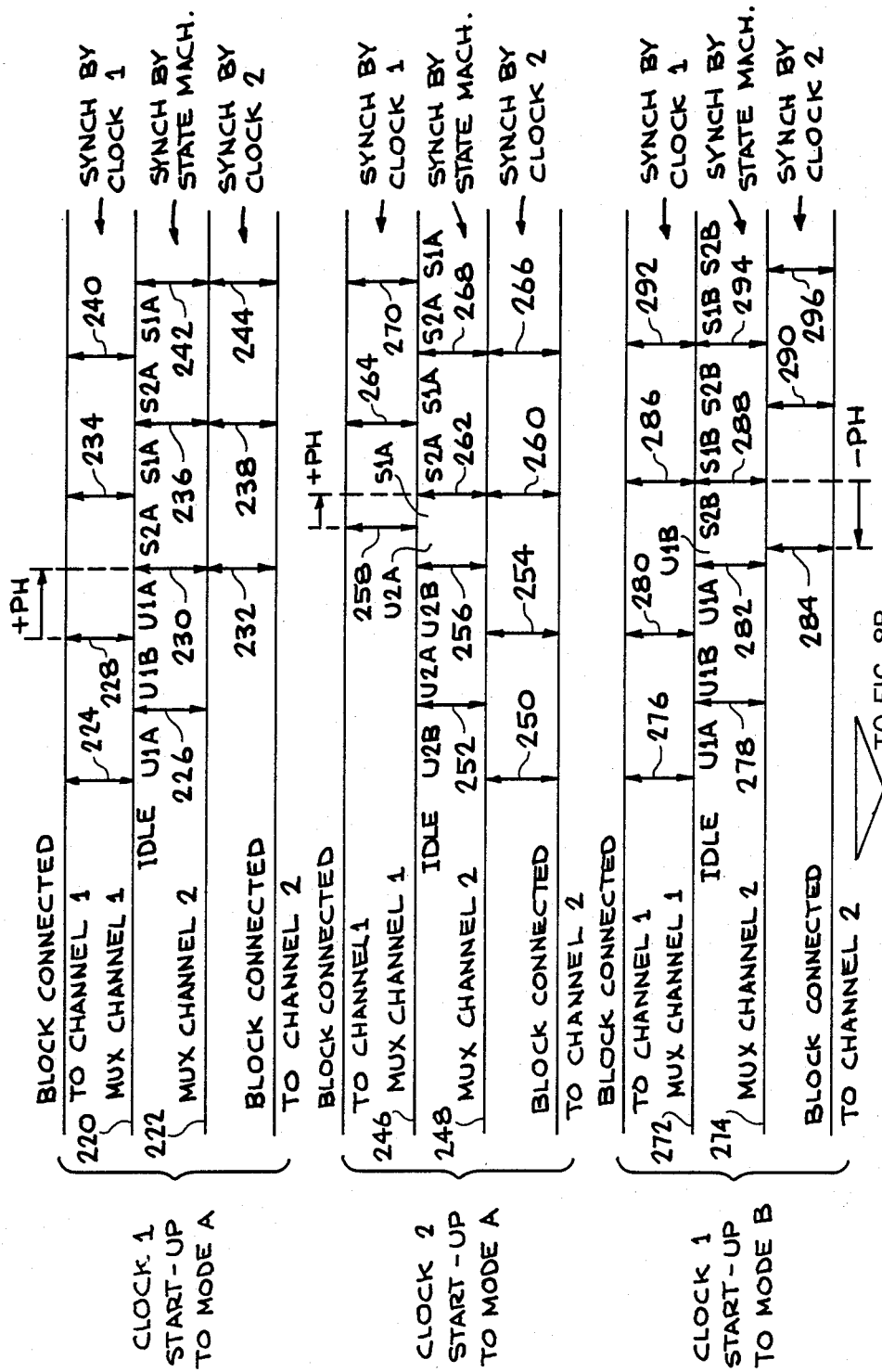

With reference now to FIG. 8, several examples of the synchronizing function performed by the master/slave multiplexer of the present invention are illustrated in data-transfer timing diagrams. Each example shows the use of either CLOCK1 or CLOCK2 as the synchronizing clock for accesses to a "CHANNEL1" and a "CHANNEL2"; either of which can be any of the four channels described in Table III.

As shown at channel-access lines 220 and 222, the state-machine 104 is started in IDLE state 200 indicating neither CLOCK1 nor CLOCK2 is operating. A request for a full-duplex data transfer off CHANNEL1 synchronized by CLOCK1 is indicated by vertical line 224 connected to CHANNEL1 access-line 220; thus a Transmit Request Strobe signal generated by a port device is accordingly received by Intermediate Register 112 (FIG. 6) which causes the data to be transferred therefrom to TR1 122 (FIG. 6) and the CF1 flag is set.

In accordance with FIG. 8, state-machine 104 enters U1A "unsynchronized" state 202, TIMER 108 is cleared (T←0). PHASE 126 is set to ZERO and Transmit Register2 122 is cleared. At the generation of the TIMER MIDPOINT (TM) signal a TRAN1-2 signal is generated by state machine 104 causing movement of data to MUX CHANNEL 2 as indicated by vertical line 226 connected to CHANNEL 2 access-line 222 and state-machine 104 enters U1B unsynchronized state 204.

The TRAN1-2 signal causes a Receive Enable signal to be generated which causes the transfer of data stored in TR1 (FIG. 6, 112) to RR2 (120).

While only CLOCK1 is active the state-machine 104 alternates between the U1A an U1B states. Accordingly, following state U1B, a channel access occurs as shown by vertical line 228 whereupon state U1A is reentered and data is transferred off Channel1 to IR112. This data is transferred to RR2 120 (line 230) preceded by a data transfer from channel (line 232, being the data stored in RR2 at the transfer labelled 226, via CLOCK2.

The occurrence of CLOCK2 sets CF2 and synchronized S2A state 212 is entered in accordance with FIG. 8. The "2" indicating that CLOCK2 occured most-recently; the "A" indicating positive phase. In transiting from unsynchronized state U1A to synchronized state S2A the mode A remains unchanged. Normally, the mode changes infrequently and the state machine 104 either alternates between S1A and S2A has shown on access lines 220 and 222 to vertical lines 234, 236, 238, 240, 242 and 244 or between S1B and S2B, as each clock occurs.

Timing measurements by TIMER 108 begin on the leading clock (CLOCK1 in mode A, CLOCK2 in mode B) and ends on the lagging clock, a positive phase relationship between CLOCK1 and CLOCK2 measured (PH in FIG. 8) in accordance with FIG. 7 at line 234.

With reference now to the second example illustrated in FIG. 8, on channel-access lines 246 and 248, the state machine 104 is started in Idle state 200. A CLOCK2 signal is requested to access CHANNEL2, as indicated by vertical line 250. The CF2 flag is thus set and state-machine 104 enters U2B unsynchronized state 208. A TM signal is generated by TIMER 108 and U1A state 206 is entered. A TRANS1-2 signal is generated by state-machine 104, in accordance with FIG. 7 and a transfer is used for CHANNEL2 to CHANNEL1 shows by vertical line 252.

A CLOCK2 is again used for CHANNEL2 access (line 254) and a CF2 signal is generated and U2B state 208 is entered. A TM signal is generated and CLOCK2 is then used for a CHANNEL2-CHANNEL1 transfer (line 256) to RR1. State U2A is then entered upon which a CLOCK1 occurs, setting CF1. Accordingly, state S1A is entered and a CHANNEL2 access is accomplished by CLOCK2 (line 260), preceded by a data transfer from CHANNEL2 to CHANNEL1 (line 262).

A transition is next made from state S1A to S2A upon setting of CF2 and the PH is set to timer 108 value in accordance with FIG. 7. Alternation is now between states S1A and S2A, as was explained in connection with the first examples, as indicated by data transfers 264, 226, 268 and 270.

The third example illustrated in FIG. 8 on channel-access lines 272 and 274, begins as in the first example, vertical lines 276, 278, 280 and 282 corresponding to 224, 226, 228 and 230, respectively. When in the U1A state, however, the TM signal is generated prior to onset of the CLOCK2 transfer request, which occurs at line 284. Accordingly, state U1B is entered in this example, in accordance with state-transition matrix of FIG. 7. In the transition to U1B, the TRANS1-2 is generated causing the transfer shown as line 282. The transfer 284 is a CF2 event called for by the transition from U1B to S2B. The TIMER 108 is reset to zero during this transition as well.

The data transfer request signalled by CLOCK1 (line 286 occasions the transition to state S1B as specified by FIG. 7, as well as the setting of the phase PH to −T, and the TRANS1-2 (line 288). In this example then, the occurrence of CLOCK2 (line 284) before CLOCK1 (line 286) dictates a mode B operation of state machine 104. The states then alternate between S2B and S1B as indicated by data transfers 290, 292, 294 and 296.

The fourth example illustrated in FIG. 8, on channel-access lines 298 and 300, begins as in the second example, vertical lines 302, 304, 306 and 308 corresponding to 250, 252, 254 and 256, respectively. When in state U2B however, the TM signal is not received before reception of the CLOCK1 request (line 310) and thus a transition to state S1B occurs in accordance with FIG. 7. Also, the PH variable is set to negative the contents of TIMER 106 in accordance with FIG. 7, and thus the State machine operates in mode B alternating between states S1B and S2B, lines 312, 314, 316, 318, 310 and 322.

A fifth example of FIG. 8 illustrates data slip in mode A. The example is shown with channel-access lines 324 and 326, and begins in state S1A, and accordingly can be considered an extension of the first example, proceeding with vertical lines 242 and 244. A CLOCK1 request is received at line 328 having a positive phase +PH with respect to the occurrence of the next CLOCK2 request 332, preceding the TRANS1-2 (330). Another CLOCK1 requested at 334 causing transition back to state S1A. However, rather than a CLOCK2 request 338, preceding a TRANS1-2 (336) prior to the next CLOCK1 request, the CLOCK1 request 340 occurs before 336 and 338.

This results in data loss because of overwriting of the contents of IR112. In accordance with FIG. 7 then, the SLIP indicator is set to 1 and the PHASE, TIMER and TR2 register is cleared. The state S1A is reentered and upon reception of CLOCK2 338 a transition to state S2A is made.

The presence of the next CLOCK1 (342) causes a transition to state S1A and resetting of TIMER. The occurrence of CLOCK2 (346) causes a transition to state S2A and the TRANS1-2 (344) and the resetting of phase, in accordance with the new relative timing of CLOCK2 and CLOCK1.

A sixth example of FIG. 8 illustrates data slip in mode B. The example is shown with channel-access lines 348 and 350, and begins in State S2B, and accordingly can be considered an extension of the fourth examples, proceeding with vertical lines 314 and 316. A CLOCK2 request is received at line 352 having a negative phase −PH with respect to the occurrence of the next CLOCK1 request 354, preceding the TRANS1-2 (356). Another CLOCK2 requested at 358 causes transition back to state S2B. However rather than a CLOCK1 request; a CLOCK2 request is received at 360, followed by a CLOCK1 request 362 and a TRANS1-2 364.

The CLOCK2 request 360 occurring in state S2B causes the slip indicator to be set to 1, phase (PH) TIMER (T) and TR1 cleared, in accordance with FIG. 7, and return to state S2B. Reception of CLOCK1 362 in state S2B causes transition to S1B and resetting of phase, in accordance with the new relative timing of CLOCK1 and CLOCK2.

Figure 9:
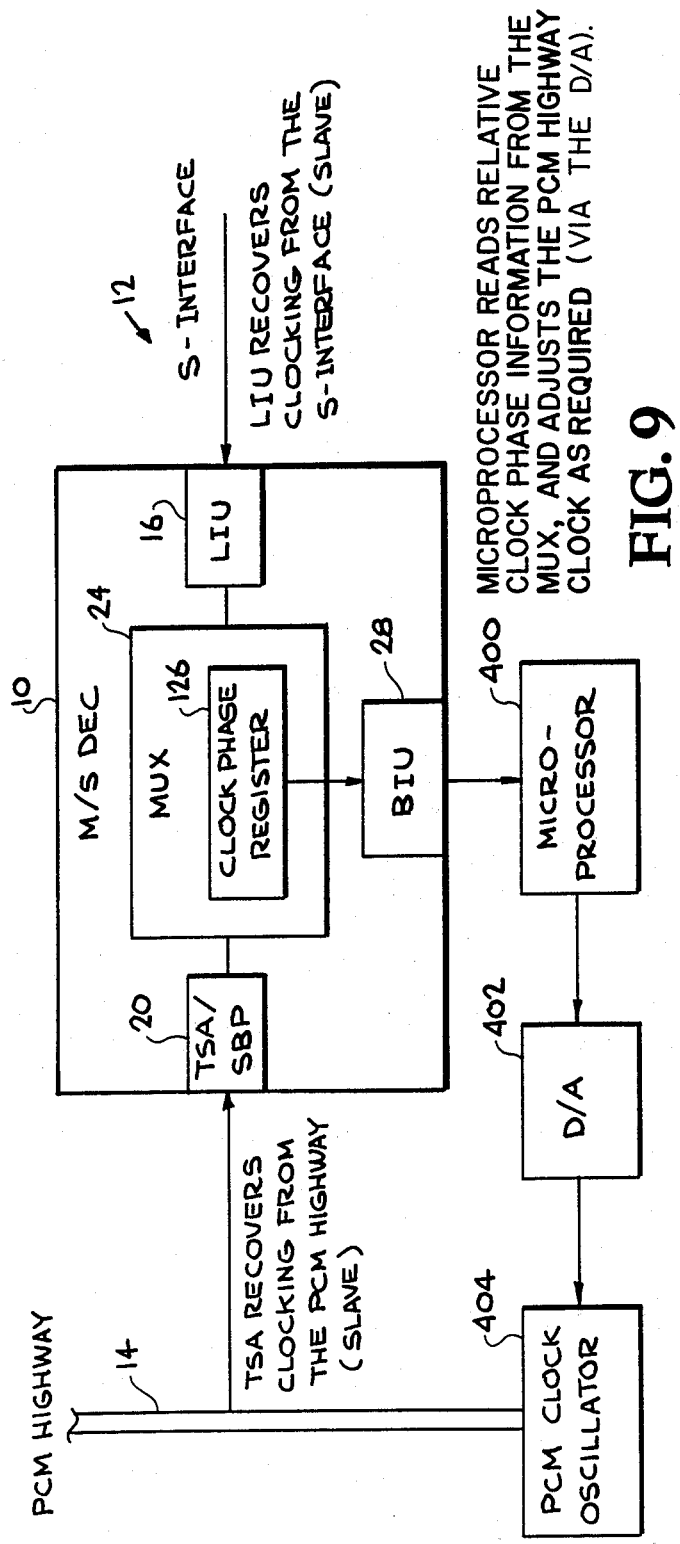
FIG. 9 illustrates an application of M/S DEC 10 in controlling the frequency of a PCM Highway.

A further aspect of the instant invention is illustrated in FIG. 9. The M/S DEC 10 of the instant invention is shown in an application connected to an "S" interface 12 via LIU block 16 and to a PCM Highway 14 via TSA/SBP 20. A microprocessor 400 is connected to M/S DEC 10 via BIU 28. BIU 28 interconnects the microprocessor 400 with the clock phase register 126 (FIG. 6) within MUX 24. A digital-to-analog (D/A) converter 402 is connected to microprocessor 400, and D/A 402, in turn, is connected to a PCM clock oscillator 404 which controls the frequency of signals conducted on PCM Highway 14.

When the M/S DEC 10 is operating in the Slave/Slave mode, the clock signals received over the "S" interface 12 and the PCM Highway 14 may be asynchronous, with respect to one another. M/S DEC 10 will buffer the misalignment of the clocks as described in connection with FIGS. 7 and 8. The phase difference between these clock signals is measured by TIMER 108 (FIG. 6) and reported in phase register 126. Microprocessor 400 can read the contents of phase register 126 via BIU 28 and use this relative phase information to generate an adjustment signal to D/A 402. For instance, oscillator 406 may be a voltage-controlled crystal oscillator.

D/A 402 generates therefrom an analog electrical signal received by PCM clock oscillator 404 which adjusts the frequency of the PCM Highway 14.

| APPENDIX GLOSSARY OF SIGNALS APPEARING IN FIGS. 4A AND 4B | |
|---|---|
| CLOCK MUX 100 | |
| MXI Load 3 | is the load signal for the transmit registers of port 3 and the load for the intermediate register on the receive of side port 3 |
| Frame clock 3 | (FRAMECK3) Is the input frame clock to the CLOCK MUX 100 from port 3 if it is in a slave mode or is the frame clock to port 3 from the CLOCK MUX if port 3 is a master. |
| Slave 3 | Comes from port 3 and tells the CLOCK MUX 100 whether port 3 is a slave or master on its clock block. |
| Resync 3 | Request for the CLOCK MUX 100 to resync state machine 104 and is valid only if port 3 is a slave |
| MX1 Load 2 | Is the load signal for the transmit registers of port 2 and it loads the intermediate receive registers on port 2. |
| Frame clock 2 | is the frame clock input to the MUX 100 if port 2 is a slave or if port 2 is not a slave is the frame clock output from the MUX. |
| Slave 2 | is an input from port 2 to tell the MUX whether or not port 2 is a slave |
| Resync 2 | Request for the MUX 100 to resync its state machine 104 and is only valid if port 2 is a slave |
| MX1 Load 1 | Is the signal that loads the transmit register on port one and loads intermediate receive registers on port 1. |

-continued
APPENDIX
GLOSSARY OF SIGNALS APPEARING IN FIGS. 4A AND 4B

CLOCK MUX 100

| | |
|---|---|
| Frame Clock 1 | (FRAMECK1) Is a frame clock input to the MUX 100 if port 1 is a slave or if port one is not a slave it is output from the MUX. |
| Slave 1 | Is an output from port 1 to tell the MUX 100 whether port 1 is a slave or master |
| Resync 1 | Is a signal from port 1 to request that the MUX resynchronize state machine 104 and is only valid if slave 1 is active. |
| MX1 Load 5 | Is a signal to load the transmit registers on port 5 and loads the intermediate receive registers on port 5. |
| Frame clock 5 | (FRAMECK5) Is a frame clock input to the MUX if port 5 is a slave or it is a clock output from the MUX if port 5 is not a slave. |
| Slave 5 | Is input to the MUX from port 5 to tell whether or not port 5 is a slave or a master |
| Resync 5 | Is an input to the MUX to request the MUX resynchronize state machine and is valid only if port 5 is a slave |

PORT DECODE 110

The bus MX1 RE4 3:0 conducts the four signals that load the receive registers on port 4.

Signal 0 loads channel A receive register, signal 1 loads channel B receive register, signal 2 loads channel C receive register, Signal 3 loads the spare channel receive register and that is true of all 5 ports.

MX1 TE4 3:0 is the transmit enable signal for port 4.

Number 0 enables channel A on to the MUX bus 60, Number 1 enables channel B on the MUX bus 60, Number 2 enables channel C on to the MUX bus 60 and Number 3 enables the spare channel onto the MUX bus 60; and that is true of all 5 ports.

MX1 TE5 3:0 is the transmit signals for the four channels in port 5.

MX1 RE5 3:0 is the four receive enable signals for the four channels on port 5.

MX1 TE1 is the four transmit enable signals for the four channels in port 1.

MX1 RE1 3:0 is the four receive enable signals for the four channels in port 1.

MX1 TE2 is the four transmit enable signals for the four channels in port 2.

MX1 RE2 is the four receive enable signals for the four channels in port 2.

MX1 TE3 is the four transmit enable signals for the four channels in port 3.

MX1 RE3 is the four receive enable signals for the four channels on port 3.

The transmit enable signals enable the channel data onto the MUX bus 60 and the receive enable signals load the receive registers from the MUX bus.

TSA2 or 8 is input from the TSA 20 to the MUX 24 to indicate to the DLC 26 if the TSA is transmitting 8 bits per byte or 2 bit per byte.

MX2 or 8 is output from the MUX and goes to the DLC to indicate to the DLC if it should be assembling 2 bits per byte or 8 bits per byte. If there is a TSA to DLC connection programmed in the MUX, MX2 or 8 will be equal to TSA2 or 8. If the TSA is not connected to the DLC, MX2 or 8 will be 1 or 0 based on the other path programmed in the MUX.

CLKSRC4:0 are the five bits written into the clock source register by the microprocessor.

Bit 0 indicates which CLOCK (i=1,2) port 1 is synchronized by.

Bit 1 indicates which CLOCK (i=1,2) port 2 is synchronized by.

Bit 2 indicates which CLOCK (i=1,2) port 3 is synchronized by.

Bit 3 indicates which CLOCK (i=1,2) port 4 is synchronized by.

Bit 4 indicates which CLOCK (i=1,2) port 5 is synchronized by.

If each of the bits is 1 that port is connected to CLOCK2, if the bit is a 0 that port is hooked up to CLOCK1.

FIRSTE3:0 are four bits encoding one end of a path across the MUX bus 60.

SCNDE3:0 are four bits encoding the other end of the path across the MUX bus.

As data is moved across the MUX bus the FIRSTE and SCNDE take on the value for path registers 1, 2, 3, 4 and 5; and are written via the microprocessor interface. For each transfer across the MUX bus FIRSTE goes out on transmit signal and SCNDE goes out on receive signal and then the SCNDE goes out on transmit signal and FIRSTE goes outon receive signal to make a full duplex transmit and receive across the MUX bus.

PH1 is the system clock running at approximately 6 mHz.

PH2 is the system clock that is out of phase with E1 running at the same frequency.

RESET is the system reset that clears all status and programming and starts up the MUX in a known state.

SS1 is used in the port decode to update the MX2 or 8 signal going to the DLC.

SS10-11 is used to indicate to the Port Decode block 110 when the spare bits are being transmitted.

FIRST is used by Port Decode 110 to tell when to do the first half of a full duplex transmit and receive. When FIRST is high FIRSTE goes out on the transmit signal and SCNDE goes out on the receive signal. When FIRST is low the SCNDE goes out on the transmit signal and FIRSTE goes out on the receive signal.

IDLE is used by the Port Decode 110 to disable all activity on the MUX bus when the DEC10 is in idle state and is primarily used to reduce power.

NOTRAN is used to prevent any activity on the MUX bus when there are no transfers occurring across the MUX bus and this is also used to reduce power.

TRAN1-1 is active whenever a full duplex transfer across the MUX 60 bus is occurring between two ports that are both synchronized by CLOCK1.

TRAN1-2 is active whenever there is a full duplex transfer across the MUX bus occurring between two ports where one port is synchronized by CLOCK1 and the other is synchronized by CLOCK2.

TRANS2-1 is active when a full duplex transfer across the MUX 60 bus is occurring between two ports that are both synchronized by CLOCK2.

The Port Decode block 110 examines the path-end encoded on FIRSTE and SCNDE and compares them with what kind of transfer is being done: 11,12,22 and decides whether or not to do a transfer. If FIRSTE is a port synchronized by CLOCK1 and SCNDE is a port synchronized by CLOCK2 a transfer will be done only if TRANS1-2 is active. If FIRSTE is a port synchronized by CLOCK2 and SCNDE is a port synchronized by CLOCK2 a transfer will be done only if TRAN2-2 is active. If FIRSTE is a port synchronized by a CLOCK1 and SCNDE is a port synchronized by CLOCK1 a transfer will be done only if TRAN1-1 is active. If FIRSTE is a port synchronized by CLOCK2 and SCNDE is a port synchronized by CLOCK1 a transfer will be done only if TRAN1-2 is active.

REGISTERS 102

BIUD7:0 is the BIU data bus that is used to read and write the status registers in the MUX and to read and write the port for A, B, C and spare registers in the MUX.

BIUAD3:0 is the BIU address lines used to address which registers are being written or read in the MUX.

BIUINT is interrupt signal that indicates data has been received across the MUX bus into the A, B, C or spare registers in port 4.

BISELBIU is used to enable reading and writing of port 4 registers and BIU registers in the MUX.

LDPHASE causes the value in the timer to be loaded into the Phase register in the MUX.

SIGN is used to indicate whether CLOCK 1 is leading CLOCK 2 or CLOCK 2 is leading CLOCK 1 and is latched into the phase register in the MUX by load phase.

SLIP is used to indicate loss of data across the MUX bus 60 and can be read as status bit via the microprocessor interface and generates an interrupt.

SS1-2 cause the first path register to be driven onto the MUX bus 60 as FIRSTE and SCNDE.

SS3-4 causes the path two register to be driven onto the MUX bus 60 as FIRSTE and SCNDE.

SS5-6 causes the third path register to be driven onto the MUX bus 60 as FIRSTE and SCNDE.

SS7-8 causes the fourth path register to be driven onto the MUX bus 60 as FIRSTE and SCNDE.

SS9-10 causes the fifth path register to be driven onto the MUX bus 60 as FIRSTE and SCNDE.

When no transfers are being done across the MUX bus SS1-2 is active, SS3-4, 5-6, 7-8, 9-10 are inactive. When transfers are to be done across the MUX bus as indicated by TRAN1-1, TRAN1-2, or then SS3-4 will go active for two clock cycles then SS5-6 will go active for two clock cycles and SS7-8 will go active for two clockcycles and then SS9-10 will go active for two cycles.

TIMER5:0 is the output of the timer that indicates the phase between clock 1 and clock 2 and is read by the microprocessor as the phase register.

IDLE signal is used in the registers block to clear all status.

PH2 is the system clock running at 6 mHz.

MXINT is an interrupt output from the MUX 24 to the BIU 28 that indicates a SLIP has occurred.

BIUSELMX is an enable signal to enable reading and writing of MUX registers.

BIUWRITE allows BIU to write data into registers in the MUX.

BUIREAD enables reading of MUX registers by the BUI.

RESET resets all the data and all the MUX and BUI registers.

SCNDE3:0 as described for Port Decode 110.
FIRSTE3:0 as described for Port Decode 110.
CLKSCR4:0 as described for Port Decode 110.
MX1TE4 3:0 as described for Port Decode 110.
MX1RE4 3:0 as described for the Port Decode 110.

TIMER 108

RESET resets the Timer to all zeros.

CLEAR TIMER comes from the State Machine 104 to reset the Timer to all zeros.

CLKTIMER increments the Timer by one every positive transition.

TM indicates the mid-point of the Timer.

TOV indicates a Timer overflow.

TIMER5:0 is the output of the timer, the timer is a 6 bit binary ripple counter.

STATE COUNTER 106

STATE COUNTER 106 generates all the timing signals for the MUX 24.

DEF8K is an 8 kilohertz clock that is a binary divide of the system PHI clock. The default 8K clock goes to the clock MUX and is used as a frame clock if none of the ports are programmed onto a clock bus, i.e., CLOCK1 has all the ports programmed on to as masters then CLOCK1 output of the clock MUX would be DEF8K or if CLOCK2 did not have any ports attached to it at all then CLOCK2 would be DEF8K.

MX192K is a 192 kilohertz clock divided down from the systems PHI clock and is used as a bit clock by other ports.

NOTRAN is active only when there are no transfers being done across the MUX bus 60.

SS12 is output indicating the last state of the 12 states in the state machine cycle.

SS1 is the first state of the 12 states in the state machine cycle.

SS3 is the second state of the 12 states in the state machine cycle.

RESET used to start the state counter over at zero.

PH1 is the 6 mHz system clock.

PH2 is the 6 mHz system clock out of phase with B1.

SS1-2 as described for Registers block 102.
SS3-4 as described for Registers block 102.
SS5-6 as described for Registers block 102.
SS7-8 as described for Registers block 102.
SS9-10 as described for Registers block 102.
SS10-11 as described for Port Decode block 110.
FIRST as described in the Port Decode block 110.

STATE MACHINE 104

LOAD C1 is an output signal from the State Machine and occurs at the beginning of every state machine cycle coincident with SS1 if a clock 1 had occurred in the middle of the previous state machine cycle.

LOAD C2 is an output signal from the state machine to the clock MUX 100 and occurs coincident with SS1 if a clock 2 has occurred in the previous state machine cycle.

LOAD C1 is used to generate the MX1 load signals output from the Clock MUX 100 and LOAD C2 is also used the generate the MX1 load signals output from the Clock MUX. Which load signal generates which MX load signal depends on which clock each port is synchronized by. If port 1 is synchronized by CLOCK1 then MX1 LOAD1 will be equal to LOAD C1. If port 2 is synchronized by CLOCK2 then MX1 LOAD2 is equal to LOAD C2.

CLOCK1 is the frame clock output conducted from the Clock MUX 100 to the State Machine and is generated by the slave port generating CLOCK1 or default 8K if there is no one slave.

CLOCK2 is output from the clock MUX 100 to the State Machine and is generated by the Slave generating CLOCK2. If there is no Slave driving CLOCK2 then DEF8K generates CLOCK2. CLOCK1 and CLOCK2 are based on the contents clock source registers.

RESREQ is a resync request to the State Machine indicating entry into an idle state and is generated by the slave driving the CLOCK (i=1 or 2). So the slave on CLOCK1 can generate a resync request and a slave on CLOCK2 can generate a resync request.

LOAD PHASE is used to load the timer value in the phase register so the Micro processor can read the phase relationship between CLOCK1 and CLOCK2 when a 1-2 transfer is done across the MUX bus 60.

SIGN is load into the phase register when LOAD PHASE goes active and indicates to the microprocessor whether clock 1 is leading clock 2 or clock 2 is leading clock 1.

SLIP is active whenever data is lost in transfers across the MUX bus.

NO TRAN is active whenever there are no transfers to be done across the MUX bus.

SS12 is used to sample clock 1 and clock 2.

SS1 is used to update N11, TRAN22, CLK 1, CLK 2, and RESYNC FLAG into the state machine.

SS2 is used to update the present state of the State Machine.

RESET used to clear all signals out of the State Machine.

PH2 is a system clock running at 6 mHz.

CLEAR TIMER used to clear the phase information.

CLK TIMER clocks the Timer once per state when not in an idle state

TM timer mid-point.

TOV indicates timer overflow and plans the State Machine back in an idle state

TRAN1-1, TRAN1-2, TRAN2-2 are described for Port Decode block 110.

What is claimed is:

1. A synchronizer having a plurality of ports each connected to a device, each device operable as a slave or a master device receiving or generating a clock signal, respectively, synchronizing transmission of data through said device comprising:

a plurality of registers (102) each having plural-bit contents received from and/or conducted to a microprocessor external to said synchronizer;

data-routing multiplexer means (50, 108, 110) operably connected to said plurality of registers, responsive to at least a first and a second synchronizing clock signal for selectably establishing transmission paths between pairs of said ports and for transmitting data on said paths with a selectable one of said first or second synchronizing clock signals; and clock-routing means (100, 102, 104, 106) operably connected to said plurality of registers, responsive to said device clock signals for generating said first and said second synchronizing clock signals, said signals selected as said slave and said master, said master and said slave, or said slave and said slave signals, respectively.

2. A synchronizer according to claim 1 wherein said data-routing multiplexer means comprising:

first timing means (110) responsive to said first and second synchronizing clock signals for generating a plurality of transmit and receive enable signals; and a plurality of means (50) each responsive to said first and second synchronizing clock signals and responsive to predetermined ones of said transmit and receive enable signals for buffering signals conducted on said transmission paths.

3. A synchronizer according to claim 2 wherein said data-routing multiplexer means further includes:

second timing means (108) responsive to said first and second synchronizing clock signals for generating a signal indicative of the relative phase between said first and said second synchronizing clock signals.

4. A synchronizer according to claim 2 wherein said transmission paths conduct data signals transmitted in frames, wherein said buffering means is further responsive to a plurality of load register signals and further for aligning data into said frames, said plurality of registers including a register containing clock-transfer indicators, said first timing means responsive to signals indicative of said clock-transfer indicators and to a plurality of transfer-status signals, said clock-routing means comprising:

clock-routing multiplexer means (100) responsive to said device clock signals for generating said first and said second synchronizing clock signals and for generating said plurality of load register signals;

state-machine and counter means (104, 106) responsive to said first and said second synchronizing clock signals for generating said plurality of transfer-states signals.

5. A synchronizer according to claim 3 wherein said transmission paths conduct data signals transmitted in frames, wherein said buffering means is further responsive to a plurality of load register signals and further for aligning data into said frames, said plurality of registers including a register containing clock-transfer indicators, said first timing means responsive to signals indicative of said clock-transfer indicators and to a plurality of transfer-status signals, said clock-routine means comprising:

clock-routine multiplexer means (100) responsive to said device clock signals for generating said first and said second synchronizing clock signals and for generating said plurality of load register signals;

state machine and counter means (104, 196) responsive to said first and said second synchronizing clock signals for generating said plurality of transfer-states signals; and wherein said second timing means is further for generating a midpoint signal and an overflow signal, said state-machine and counter means is responsive to said midpoint and overflow signals, said state-machine and counter means is further for generating signals indicative of a data slip.

6. A synchronizer according to claim 4 wherein said plurality of buffering means each include at least a receive register having an input connected to a predetermined one of said devices and an output and a transmit register having an output connected to said predetermined device and an input, each responsive to predetermined ones of said load register signals, said data-routing multiplexer means further including a bus connected to said first timing means, to each said receive register output and to each said transmit register input;

wherein said bus conducts time-division multiplexed signals in response to said transfer-status signals, to said load register signals and to said transmit and receive enable signals.

7. A method of synchronizing transmission of data through a multiplexer, having a plurality of ports, responsive in a first mode to first and second synchronizing clock signals and in a second mode to an active clock signal being said first or said second synchronizing clock signals, comprising the steps:
(a) synchronously transferring said data between a first buffer and a first port using said first synchronizing clock signal when in said first mode, and using said active synchronizing clock signal, when in said second mode;
(b) routing said data between said first buffer and a second buffes; and
(c) synchronously transferring said data between said second buffer and a second port using said second synchronizing clock signal, when in said first mode, and using said active synchronizing clock signal when in said second mode.

8. A synchronizing method according to claim 7 further incuding the steps, when in said first mode:
(d) measuring whether said first synchronizing clock signal leads or lags with respect to said second synchronizing clock signal; and
(e) indicating a data slip when either said first synchronizing clock signal is leading said second synchronizing clock signal and two of said first synchronzing clock signals are received within a predetermined time interval, or said second synchronizing clock signal is lagging said first synchronizing clock signal and two of said second synchronizing clock signals are received within said predetermined time interval.

9. A synchronizing method according to claim 8 wherein said data is transmitted in frames and wherein said predetermined time interval is the time required to transmit one frame.

10. A synchronizing method according to claim 7 further when in said second mode:
(d) detecting activity of a nonactive synchronizing signal, being either said first or said second synchronizing clock signal; and
(e) entering said first mode.

11. A synchronizing method according to claim 8 wherein upon detection of step (d) of a lagging phase relationship, step (a) calls for employing said second synchronizing clock signal for said data transfers when in said first mode and step (c) calls for employing said first synchronizing clock signal for said data transfers when in said first mode; and upon detection at step (d) of a leading phase relationship, step (a) calls for reemploying said first synchronizing clock signal for said data transfers when in said first mode and step (c) calls for employing said second synchronizing clock signal for said data transfers when in said second mode.

* * * * *